(12) United States Patent
Yamazaki et al.

(10) Patent No.: US 7,373,456 B2
(45) Date of Patent: May 13, 2008

(54) DISK ARRAY APPARATUS AND DISK ARRAY APPARATUS CONTROLLING METHOD

(75) Inventors: Takashi Yamazaki, Odawara (JP); Kazuo Hakamata, Odawara (JP); Azuma Kano, Odawara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/604,216

(22) Filed: Nov. 27, 2006

(65) Prior Publication Data

US 2007/0073970 A1 Mar. 29, 2007

Related U.S. Application Data

(63) Continuation of application No. 10/812,893, filed on Mar. 31, 2004, now Pat. No. 7,281,088.

(30) Foreign Application Priority Data

Jan. 16, 2004 (JP) ............................. 2004-009004
Mar. 23, 2004 (JP) ............................... 2004-85575

(51) Int. Cl.
*G06F 12/00* (2006.01)
(52) U.S. Cl. ......................................... 711/114; 714/6
(58) Field of Classification Search ................. 711/114
See application file for complete search history.

(56) References Cited

U.S. PATENT DOCUMENTS

| 5,691,948 A | 11/1997 | Sakabe |
| 5,809,316 A | 9/1998 | Gouzu |
| 5,875,120 A | 2/1999 | Matsushima et al. |
| 5,918,059 A | 6/1999 | Tavallaei et al. |

(Continued)

FOREIGN PATENT DOCUMENTS

EP 0 623 869 A1 10/1989

(Continued)

OTHER PUBLICATIONS

United Kingdom Search Report dated Sep. 29, 2004.

(Continued)

*Primary Examiner*—Donald Sparks
*Assistant Examiner*—Matthew Bradley
(74) *Attorney, Agent, or Firm*—Reed Smith LLP; Stanley P. Fisher, Esq.; Juan Carlos A. Marquez, Esq.

(57) ABSTRACT

Times at which requests for a data read or data write from/to a logical volume are received are stored in memory as access times of a RAID group making up the logical volume. When a predetermined time has elapsed after the access time, a number of the hard disk drives according to the redundancy of the RAID group are set to a power saving mode. Assume there are first hard disk drives and second hard disk drives having shorter lives and the RAID group exceeds a predetermined time after the access time. When the RAID group consists of only the first drives, a number of the first drives according to the redundancy of the RAID group are set to a power saving mode and when it consists of only the second drives, an arbitrary number of second drives are set to a power saving mode.

9 Claims, 18 Drawing Sheets

U.S. PATENT DOCUMENTS

| | | | |
|---|---|---|---|
| 5,937,433 | A | 8/1999 | Lee et al. |
| 6,052,791 | A | 4/2000 | Chen et al. |
| 6,057,974 | A | 5/2000 | Sukigara et al. |
| 6,192,481 | B1 | 2/2001 | Deenadhayalan et al. |
| 6,233,691 | B1 | 5/2001 | Atkinson |
| 6,583,947 | B1 | 6/2003 | Hakamata et al. |
| 6,628,469 | B1 | 9/2003 | Hoyt |
| 2002/0034379 | A1 | 3/2002 | Tanaka |
| 2002/0062387 | A1 | 5/2002 | Yatziv |
| 2002/0062454 | A1 | 5/2002 | Fung |
| 2002/0144057 | A1 | 10/2002 | Li et al. |
| 2002/0199129 | A1 | 12/2002 | Bohrer et al. |
| 2003/0041283 | A1 | 2/2003 | Murphy et al. |
| 2003/0189811 | A1 | 10/2003 | Peeke et al. |
| 2003/0193732 | A1 | 10/2003 | Hakamata et al. |
| 2003/0193733 | A1 | 10/2003 | Hakamata et al. |
| 2003/0200473 | A1 | 10/2003 | Fung |
| 2003/0212859 | A1 | 11/2003 | Ellis et al. |
| 2003/0217300 | A1 | 11/2003 | Fukumori et al. |
| 2004/0054939 | A1 | 3/2004 | Guha et al. |
| 2004/0068670 | A1 | 4/2004 | Suzuki et al. |
| 2004/0068672 | A1 | 4/2004 | Fisk et al. |
| 2004/0225903 | A1 | 11/2004 | Hirezaki et al. |
| 2004/0243761 | A1* | 12/2004 | Bohrer et al. ............... 711/114 |
| 2004/0250148 | A1 | 12/2004 | Tsirkel et al. |

FOREIGN PATENT DOCUMENTS

| | | |
|---|---|---|
| EP | 0 795 824 A2 | 1/1997 |
| EP | 0 844 561 A2 | 11/1997 |
| EP | 1 001 345 A2 | 11/1999 |
| EP | 1 315 074 A2 | 2/2002 |
| JP | 2-188835 | 1/1989 |
| JP | 5-100801 | 10/1991 |
| JP | 5-150909 | 11/1991 |
| JP | 8-190762 | 1/1995 |
| JP | 9-251353 | 3/1996 |
| JP | 9-330182 | 6/1996 |
| JP | 9-330184 | 6/1996 |
| JP | 10-283123 | 4/1997 |
| JP | 10-301720 | 4/1997 |
| JP | 11-203057 | 1/1998 |
| JP | 2001-142650 | 11/1999 |
| JP | 2001-167040 | 12/1999 |
| JP | 2001-337868 | 5/2000 |
| JP | 2002-150746 | 11/2000 |
| JP | 2002-297320 | 3/2001 |
| JP | 2002-297322 | 3/2001 |
| JP | 2003-36146 | 7/2001 |
| JP | 2002-333954 | 1/2002 |
| JP | 2004-178557 | 9/2003 |
| WO | WO 99/50754 | 3/1999 |
| WO | WO 03/081416 A2 | 3/2003 |

OTHER PUBLICATIONS

Office Action (with English translation) from the German Patent Office for the corresponding German patent application, dated Nov. 18, 2004.

Gurumurthi et al., "Interplay of Energy and Performance for Disk Arrays Running Transaction Processing Workloads", Dept. of Computer Science and Engineering, The Pennsylvania State University, and IBM Research Division, Thomas J. Watson Research Center, 10 pages.

Great Britain Search Report dated Jun. 16, 2005.

Solaris, "VERITAS Volume Manager Storage Administrator™ 3.2 Administrator's Guide", Veritas Software Corporation, Jul. 2001, pp. 1-184.

Judd, Ian "Device Services Interface", Accredited Standards Committee, Jun. 19, 1996, pp. 1-8.

SATA Disk System and Expansion Unit offer 3.5 TB storage. (IBM TotalStorage DS4000 Series of Midrange Disk Systems Delivers Two New DS4000 SATA Disk Models for IBM eServer xSeries Servers), Product News Network, Nov. 1, 2004 pNA, pp. 1-2.

"SyneRAID™-800 SA SCSI/Fibre-to-SATA RAID Subsystem", Synetic Inc.,. pp. 1-3.

"EonStor", Infortrend, pp. 1-3, www.infortrend.com.

"SGI Infinite Storage TP9300S Storage Array", Silicon Graphics, 2 pp. total s.

"Cost-effective, scalable Fibre Channel to SATA RAID solution",Adaptec FS4500 Fibre to SATA RAID, adaptec, 2 pp. total.

"Serial Attached SCSI and Serial ATA Compatibility", Intel, 11 pp. total.

"EMC-2003 CLARiiON with ATA", Product Brief, ESG, 2 pp. total.

"Foreground/ Background Checking of Parity in a Redundant Array of Independent Disks-5 Storage Subsystem", IBM Technical Bulletin, vol. 38 No. 07, Jul. 1995, pp. 455-458.

Dessy, Raymond "Tutorial Computer Connections", Elsevier, Laboratory Automation and Information Management 32, pp. 53-62.

EMC 2-Gigabit Disk-Array Enclosure (DAE2) EMC Corporation, pp. i-i4.

"Backup-to-Disk: An Overview", $EMC^2$, Engineering White Paper, Mar. 3, 2003, pp. 1-10.

"Backup-to-Disk Guide with Comm Vault Galaxy", $EMC^2$, Engineering White Paper,, Mar. 3, 2003, pp. 1-26.

"Backup-to-Disk Guide with Computer Associates BrightStor Enterprise Backup", $EMC^2$, Engineering White Paper, Apr. 16, 2003, pp. 1-23.

"Backup-to-Disk Guide with Computer Associates' BrightStor ARCserve Backup", $EMC^2$, Engineering White Paper, Apr. 16, 2003, pp. 1-24.

"Backup-to-Disk Guide with LEGATO NetWorker DiskBackup Option (DBO)", $EMC^2$, Engineering White Paper, Apr. 8, 2003, pp. 1-28.

Preliminary Search Report for FR 0407220 from the French Patent Office dated Dec. 27, 2007, in French.

* cited by examiner

FIG.12
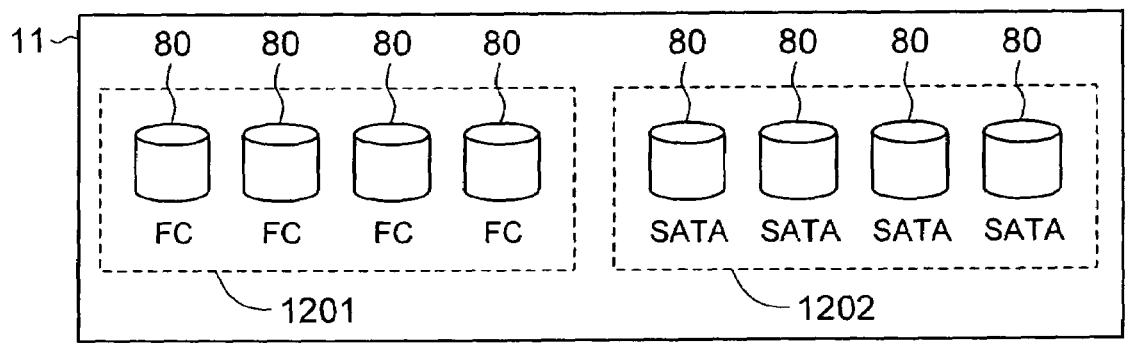
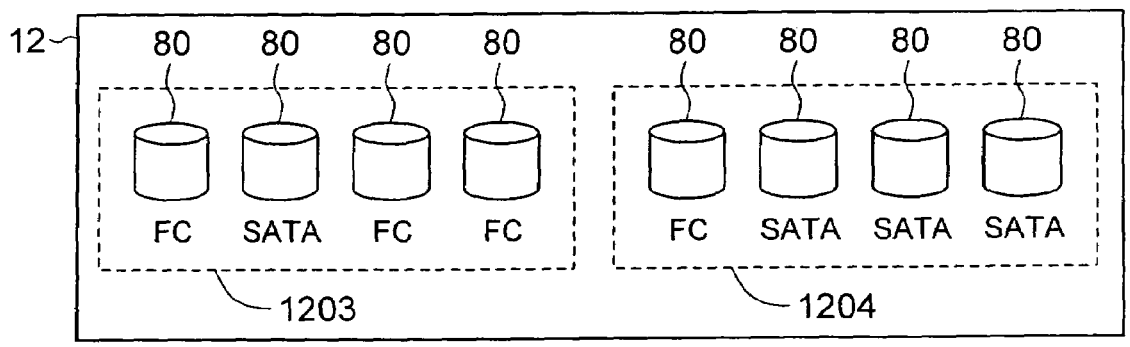

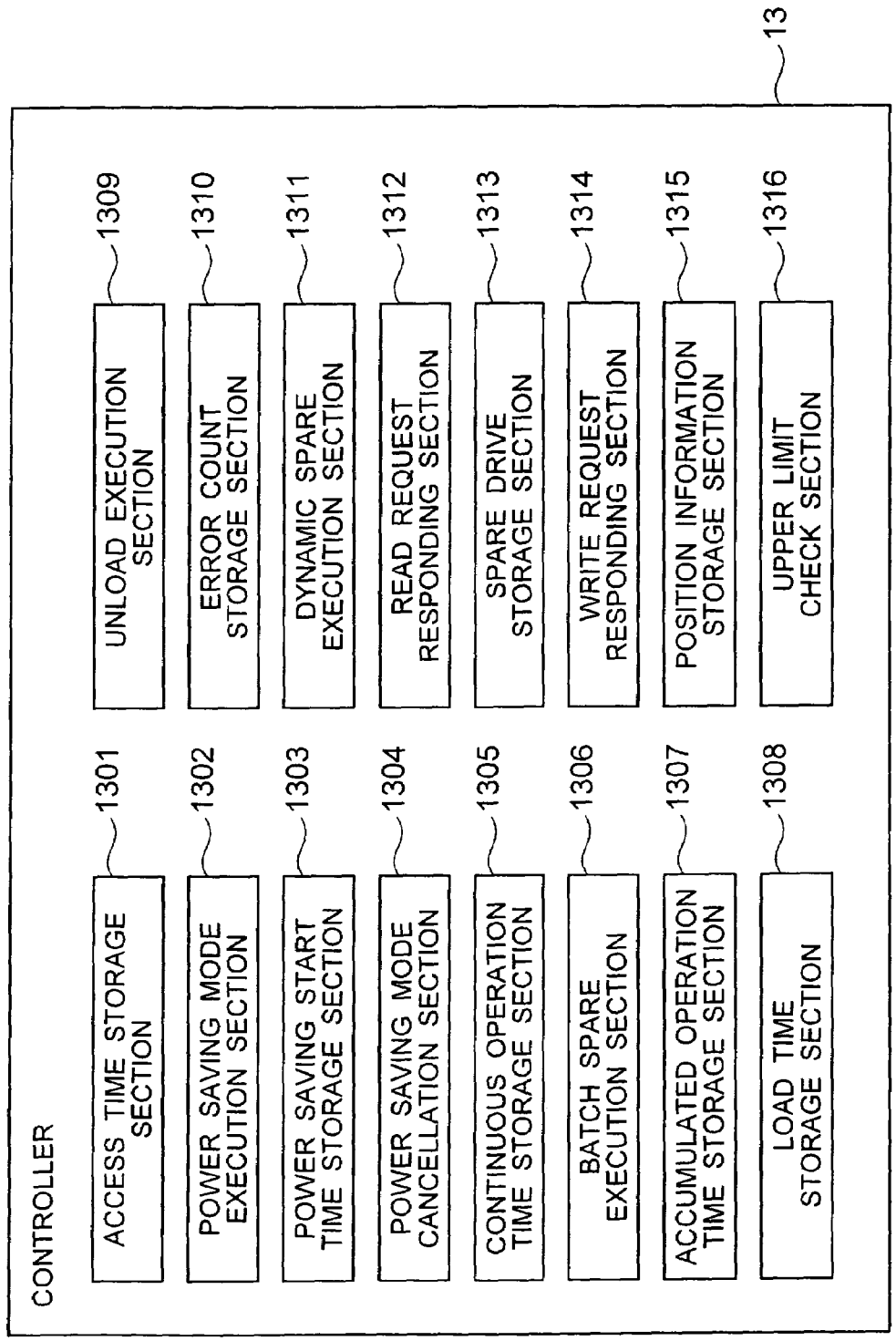

FIG.14

MEMORY

| SETTING RAID | CONTROL LUN | DRIVE TYPE | USAGE MODE | ACCESS TIME | POWER SAVING START TIME | CONTINUOUS OPERATION TIME |
|---|---|---|---|---|---|---|
| 1 | 1,2 | FC | | 12:15 | 12:00 | 30 MINUTES |
| 2 | 3 | SATA | NEAR LINE | 11:40 | | 0 |
| 3 | 4,5 | MIXED | | 10:30 | 10:50 | 0 |
| ... | ... | ... | ... | ... | ... | ... |

1401

| SETTING RAID | DRIVE NUMBER | LOAD TIME | ACCUMULATED OPERATION TIME | UNLOAD COUNT | ERROR COUNT |
|---|---|---|---|---|---|
| 1 | 1 | 11:00 | 500 | 50 | 3 |
| 1 | 2 | 11:10 | 350 | 120 | 5 |
| ... | ... | ... | ... | ... | ... |

1402

1403
| POWER SAVING WAIT TIME | POWER SAVING TIME | SPARE WAIT TIME | SPARE TIME |
|---|---|---|---|
| 20 MINUTES | 60 MINUTES | 60 MINUTES | 60 MINUTES |

1404

1405
| UNLOAD WAIT TIME | UPPER LIMIT OPERATION TIME | UPPER LIMIT UNLOAD COUNT |
|---|---|---|
| 200 MINUTES | 50,000 HOURS | 100,000 TIMES |

1406

| OPERATION TIME | UPPER LIMIT ERROR COUNT |
|---|---|
| 0~1000 | 10 |
| 1001~2000 | 5 |
| ... | ... |

1407

15

DISK ARRAY APPARATUS AND DISK ARRAY APPARATUS CONTROLLING METHOD

CROSS-REFERENCE TO RELATED APPLICATION

This application is a Continuation application of U.S. application Ser. No. 10/812,893 filed Mar. 31, 2004. Priority is claimed based on U.S. application Ser. No. 10/812,893 now U.S. Pat. No. 7,281,088 filed Mar. 31, 2004, which claims the priority of Japanese Patent Application No. 2004-009004, filed on Jan. 16, 2004, and the priority of Japanese Patent Application No. 2004-085575 filed on Mar. 23, 2004, all of which is incorporated by reference.

BACKGROUND OF THE INVENTION

The present invention relates to a disk array apparatus and disk array apparatus controlling method.

In various fields, primary importance is attached to environmental issues and a cost reduction in recent years. There is a trend among disk array apparatuses to deal with these problems by reducing power consumption. US2003/0193732A1 discloses a method of controlling access from an information processing apparatus to each hard disk drive group (RAID group) of a disk array apparatus and setting all hard disk drives which make up the RAID group to a power saving mode when there is no access for a certain period of time.

Furthermore, the disk array apparatus is required to prevent trouble with the individual hard disk drives and extend the life of the entire disk array apparatus. US6057974A discloses a method of carrying out operation of setting hard disk drives to a power saving mode (stopping spinning of magnetic disks) one by one at predetermined time intervals and thereby preventing trouble with the hard disk drives without drastically reducing the access performance.

The method according to US2003/0193732A1 sets all hard disk drives to a power saving mode for each RAID group. For this reason, when an information processing apparatus issues a request for access to a logical volume of the above described RAID group, it is necessary to cancel the power saving mode first and then respond to the access request, which drastically reduces the access performance. Thus, there is a demand for a reduction of power consumption at hard disk drives without drastically reducing the access performance.

Furthermore, a disk array apparatus combining a plurality of hard disk drives with different interface standards is used in recent years. The interface standard is, for example, a fiber channel and serial ATA. Compared to a fiber channel hard disk drive, a serial ATA hard disk drive has lower reliability and shorter life. However, the serial ATA hard disk drive is less expensive than the fiber channel hard disk drive, and so the serial ATA hard disk drive is used for tasks other than key tasks, and the serial ATA hard disk drive and fiber channel hard disk drive are often used discriminately according to their applications.

For example, suppose a disk array apparatus consists of a fiber channel hard disk drive and a serial ATA hard disk drive. In this case, since the serial ATA hard disk drive has shorter life, the life of the entire disk array apparatus is shortened by being influenced by the life of the serial ATA hard disk drive. For this reason, when the disk array apparatus consists of hard disk drives according to a plurality of interface standards, there is a demand for extending the life of the hard disk drives. Using the method disclosed in U.S. Pat. No. 6,057,974A can set hard disk drives one by one to a power saving mode, thereby prevent trouble of the hard disk drives and extend the life of the hard disk drives, but the method in U.S. Pat. No. 6,057,974A discloses no considerations about the case where a disk array apparatus consists of hard disk drives according to a plurality of interface standards.

The present invention has been implemented in view of the above described problems and it is an object of the present invention to provide a disk array apparatus and disk array apparatus controlling method.

SUMMARY OF THE INVENTION

In order to solve the above described problems, the present invention relates to a disk array apparatus connected to an information processing apparatus so as to be able to communicate therewith, comprising a plurality of hard disk drives and a controller constructed by including a host interface which receives a request for a data read and request for a data write from/to the above described hard disk drives from the above described information processing apparatus, a disk interface connected to the above described hard disk drives so as to be able to communicate therewith through a communication path which performs data input/output to/from the above described hard disk drives, a memory, a CPU which controls the above described host interface and the above described disk interface and a time counting mechanism, characterized in that a logical volume is formed in a RAID group with redundancy made up of a plurality of the above described hard disk drives and the above described disk array apparatus comprises an access time storage section which stores, upon reception of a request for a data read or request for a data write from/to the above described logical volume from the above described information processing apparatus, the time acquired from the above described time counting mechanism as the access time in the above described memory in association with an identifier of the above described RAID group in which the above described logical volume is formed and a power saving mode execution section which refers to the above described access time stored in the above described memory and sets a number of the above described hard disk drives according to the redundancy of the above described RAID group to a power saving mode when the difference between the time acquired from the above described time counting mechanism and the above described access time exceeds a predetermined time.

Furthermore, the present invention relates to a disk array apparatus connected to an information processing apparatus so as to be able to communicate therewith, comprising a plurality of first hard disk drives which perform data transmission/reception according to a first interface standard, a plurality of second hard disk drives which perform data transmission/reception according to a second interface standard having a shorter life than the above described first hard disk drives and a controller constructed by including a host interface which receives a request for a data read and request for a data write from/to the above described first or second hard disk drives from the above described information processing apparatus, a disk interface connected to the above described first or second hard disk drives so as to be able to communicate therewith through a communication path which performs data input/output to/from the above described first or second hard disk drives, a memory, a CPU which controls the above described host interface and the above described disk interface and a time counting mechanism, characterized in that a logical volume is formed in a RAID group consisting of a plurality of the above described first or second hard disk drives and the above described disk array apparatus comprises an access time storage section which stores, upon reception of a request for a data read or request for a data write from/to the above described logical volume is received from the above described information processing apparatus, the time acquired from the above described time counting mechanism as the access time in the above described memory in association with an identifier of the above described RAID group in which the above described logical volume is formed and a power saving mode execution section which refers to the above described access time stored in the above described memory and sets, for the above described RAID group whose difference between the time acquired from the above described time counting mechanism and the above described access time exceeds a predetermined time, a number of the above described first hard disk drives according to the redundancy of the above described RAID group to a power saving mode when the RAID group consists of only the first hard disk drives and sets an arbitrary number of the above described second hard disk drives to a power saving mode when the above described RAID group consists of only the above described second hard disk drives, a power saving start time storage section which stores the time acquired from the above described time counting mechanism as a power saving start time in the above described memory in association with an identifier of the RAID group when the above described first or second hard disk drives are set to a power saving mode by the above described power saving mode execution section and a power saving mode cancellation section which refers to the above described power saving start time and cancels the power saving mode of the above described first or second hard disk drives in the power saving mode when the difference between the above described power saving start time and the time acquired from the above described time counting mechanism exceeds a predetermined time.

The present invention can provide a disk array apparatus and a disk array apparatus controlling method.

Other objects, features and advantages of the invention will become apparent from the following description of the embodiments of the invention taken in conjunction with the accompanying drawings.

BRIEF DESCRIPTION OF THE DRAWINGS

FIG. 12 illustrates a configuration example of a RAID group according to the first embodiment when the converters are arranged as shown in FIG. 11;

FIG. 13 is a block diagram showing functions of a controller according to a second embodiment;

FIG. 14 illustrates a RAID group control table, hard disk drive control table, power saving control table, spare control table, unload wait time, upper limit control table and error control table according to the second embodiment;

DESCRIPTION OF THE EMBODIMENT

1. First Embodiment

Figure 1:
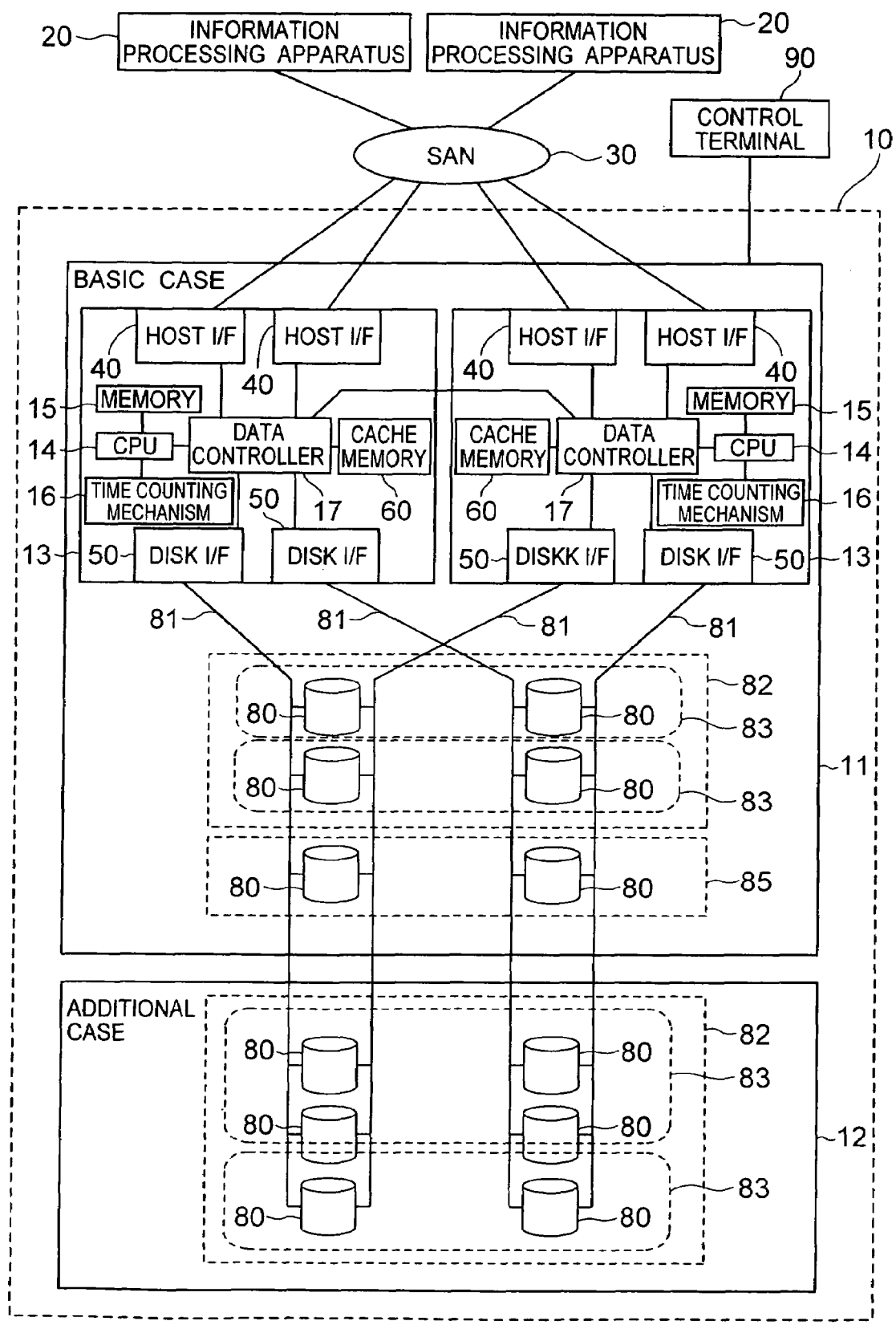
FIG. 1 is a block diagram showing a hardware configuration of a disk array apparatus according to a first embodiment and second embodiment.

FIG. 1 is a block diagram showing a hardware configuration of a disk array apparatus which will be explained as a first embodiment of the present invention.

Information processing apparatuses 20 are connected to a disk array apparatus 10 through a SAN (Storage Area Network) 30 and a control terminal 90 is also connected to the disk array apparatus 10 through a LAN (Local Area Network).

The information processing apparatus 20 is a personal computer, workstation or mainframe computer, etc. On the information processing apparatus 20, an operating system is operating. Under the operating system, application software is operating. The application software provides functions such as a bank automatic teller machine system and airplane seat reservation system.

The control terminal 90 is a computer to perform maintenance and control of the disk array apparatuses 10 and hard disk drives 80 and connected to the disk array apparatus 10 through a LAN. The LAN carries out a communication according to a protocol such as TCP/IP and is a network which connects the disk array apparatus 10 and the control terminal 90. The control terminal 90 need not always be run through communication means like LAN, but may also be connected through an SCSI (Small Computer Systems Interface) compliant communication line or Peer to Peer, etc. Furthermore, the control terminal 90 may also be incorporated in the disk array apparatus.

As shown in FIG. 1, the information processing apparatuses 20 are connected to the disk array apparatus 10 through the SAN 30. The information processing apparatus 20 is a personal computer, workstation or mainframe computer, etc.

The disk array apparatus 10 is provided with a basic case 11 and one or a plurality of additional cases 12. In this embodiment, the basic case 11 is provided with controllers 13, hard disk drives 80, etc. The controller 13 is provided with host interfaces 40, disk interfaces 50, a CPU 14, a memory 15, a time counting mechanism 16, a cache memory 60 and a data controller 17, etc. Furthermore, the additional case 12 is provided with hard disk drives 80, etc. The hard disk drives 80 of the basic case and additional case are connected to the disk interfaces 50 so as to be able to communicate therewith through communication paths 81. Details of the mode of connections between the disk interfaces 50 and hard disk drives 80 will be described later.

The host interface 40 is an interface for carrying out a communication with the information processing apparatus 20. The host interface 40 has a function of accepting a block access request according to a fiber channel protocol.

The disk interface 50 is an interface for carrying out data transfer to/from the hard disk drives 80 under instructions from the CPU 14. The disk interface 50 is provided with a function of sending a data input/output request to/from the hard disk drives 80 according to the protocol specified by a command for controlling the hard disk drives 80.

The CPU 14 controls the entire disk array apparatus 10 and controls the host interfaces 40, disk interfaces 50 and data controller 17, etc., by executing a microprogram stored in the memory 15. In addition to the microprogram, the memory 15 also stores a RAID group control table 301, etc., which will be described later.

The cache memory 60 is used to temporarily store data exchanged between the host interface 40 and disk interface 50.

The time counting mechanism 16 is a circuit capable of measuring time. The time counting mechanism 16 may also be implemented by a microprogram stored in the memory 15 not by hardware such as a circuit.

The data controller 17 transfers data between the host interface 40 and cache memory 60 or between the cache memory 60 and disk interface 50 under the control of the CPU 14.

The controller 13 is provided with a function of controlling the hard disk drives 80 at a RAID level (e.g., 0, 1, and 5) specified by a so-called RAID (Redundant Array of Inexpensive Disks) system. According to the RAID system, a plurality of hard disk drives 80 are controlled as one group (hereinafter referred to as "RAID group"). On the RAID group 82, a logical volume 83 which is a unit of access from the information processing apparatus 20 is formed and each logical volume 83 is assigned an identifier called "LUN (Logical Unit Number)."

Furthermore, the disk array apparatus 10 may also be provided with a spare drive 85 made up of one or a plurality of hard disk drives 80, which is an alternate apparatus for when trouble occurs with the hard disk drives 80 making up the RAID group 82.

In addition to the configuration explained above, the disk array apparatus may also function as an NAS (Network Attached Storage) constructed so as to accept a data input/output request from an information processing apparatus 20 by specifying a file name according to a protocol such as an NFS (Network File System).

The hard disk drive 80 is a hard disk apparatus capable of communicating according to interface standards such as an FC (Fibre Channel) and serial ATA (Serial AT Attachment). The hard disk drive 80 is provided with a plurality of magnetic disks and reads/writes data by its head accessing the data on the magnetic disk.

There are head operation systems such as a CSS (Contact Start Stop) system and a load/unload system. According to the CSS system, the head rests on the innermost radius area of the magnetic disk while the magnetic disk is not spinning and when the magnetic disk spins, the head floats above the surface of the magnetic disk through a wind pressure produced by the spinning. According to the load/unload system, the head retracts (is unloaded) to the outside of the magnetic disk while the magnetic disk is not spinning and when the magnetic disk spins, the head is moved (loaded) onto the magnetic disk.

Furthermore, the hard disk drive 80 is provided with a plurality of operating modes with different amounts of power consumption. The plurality of operating modes are realized by controlling the spinning of the spindle of the hard disk drive 80. For example, when the interface standard of the hard disk drive 80 is serial ATA, there are four operating modes; active, idle, standby and sleep. Power consumption lowers in the above described order of the four modes and the speed of responding to an access request such as a data input/output request lowers in that order. Therefore, when there is no request for access to the hard disk drive 80, setting a power saving mode such as standby and sleep can reduce power consumption of the hard disk drive 80.

The hard disk drives 80 may be integral with the disk array apparatus 10 or may also be independent thereof. The storage area provided by the hard disk drive 80 is controlled in units of the aforementioned logical volume 83. Data can be written and read to/from the hard disk drives 80 by specifying a LUN (Logical Unit Number) which is an identifier assigned to the logical volume 83.

The communication path 81 is, for example, an FC-AL (Fibre Channel Arbitrated Loop) and connects the disk interface 50 and hard disk drive 80 so as to be able to communicate with each other. The disk interface 50 and hard disk drive 80 may be connected so as to communicate with each other through an FC-AL hub or a fiber channel cable may also be connected directly.

Figure 2:
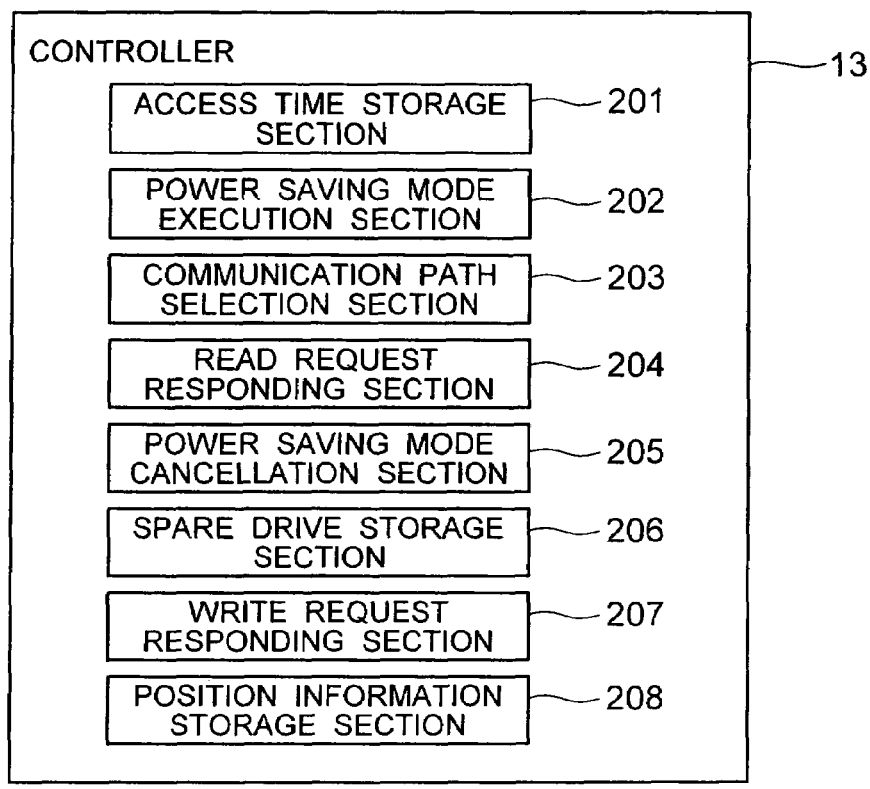
FIG. 2 is a block diagram showing functions of a controller according to the first embodiment.

FIG. 2 is a block diagram showing functions of the controller 13 according to the first embodiment. The controller 13 is provided with an access time storage section 201, a power saving mode execution section 202, a communication path selection section 203, a read request responding section 204, a power saving mode cancellation section 205, a spare drive storage section 206, a write request responding section 207 and a position information storage section 208. The respective sections 201 to 208 are implemented by the CPU 14 of the controller 13 executing a program stored in the memory 15.

Figure 3:
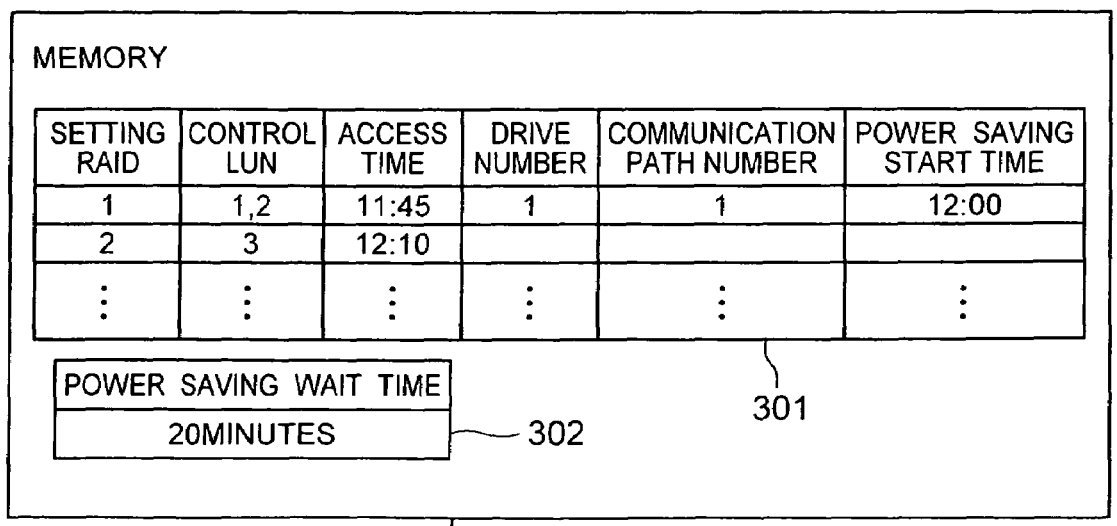
FIG. 3 illustrates a RAID group control table and power saving wait time according to the first embodiment.

FIG. 3 illustrates a RAID group control table 301 stored in the memory 15 and a power saving wait time 302.

The RAID group control table 301 includes fields like "setting RAID", "control LUN", "access time", "mounting position (drive number)", "communication path number" and "power saving start time." The "setting RAID" field sets the number indicating the RAID group.

The "control LUN" field stores the LUNs of all logical volumes 83 set in the RAID group. The "access time" field sets the time of the last access from the information processing apparatus 20 to any one of the logical volumes 83 in the RAID group 82. When the host interface 40 receives an access request from the information processing apparatus 20, the access time storage section 201 acquires the current time from the time counting mechanism 16 and sets it as the "access time." The "mounting position" field sets positions where all the hard disk drives 80 of the RAID group 82 are set to a power saving mode. The "communication path number" field sets numbers indicating the communication paths 81 to which all the hard disk drives 80 of the RAID group 82 set to a power saving mode are connected. The "power saving start time" field sets times at which the hard disk drives 80 of the RAID group 82 were set to a power saving mode. The power saving mode execution section 202 sets power saving information on the "mounting position", "communication path number" and "power saving start time" when the hard disk drives 80 are set to a power saving mode in the power saving processing which will be described later.

The power saving wait time 302 sets a time until the hard disk drive 80 is set to a power saving mode. That is, when there is no access from the information processing apparatus 20 to any one of the logical volumes 80 in the RAID group 82 for the time set in the power saving wait time 302, the hard disk drives 80 are set to a power saving mode in the RAID group 82 according to a procedure which will be described later. The power saving wait time 302 is set by the control terminal 90.

==Power Saving Processing Flow==

Figure 4:
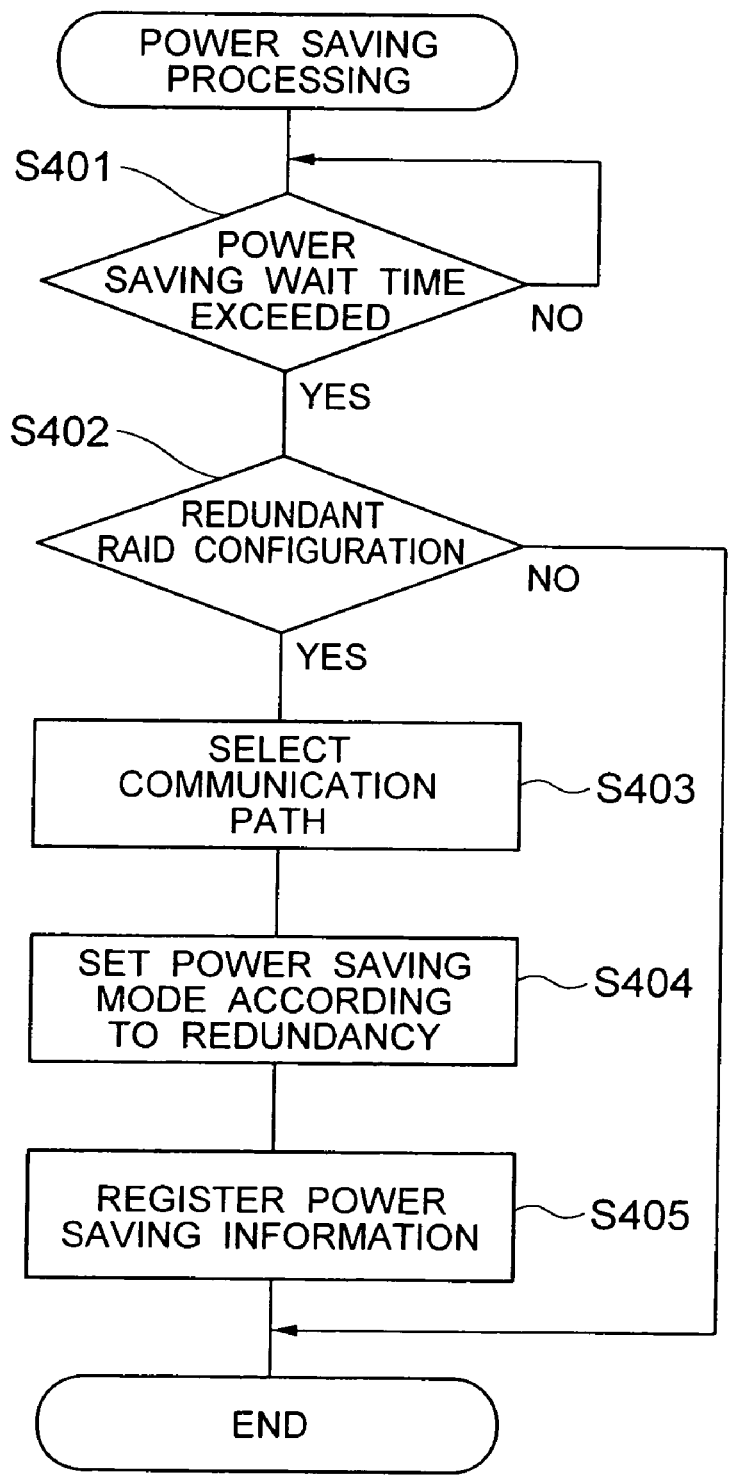
FIG. 4 is a flow chart showing power saving processing according to the first embodiment.

FIG. 4 is a flow chart showing power saving processing according to the first embodiment. The power saving processing is performed for each RAID group 82.

The power saving mode execution section 202 is monitoring the RAID group 82 as to whether the difference between the access time registered in the RAID group control table 301 and the current time exceeds the power saving wait time or not (S401). When the difference exceeds the power saving wait time, the power saving mode execution section 202 checks whether the RAID group 82 has a RAID configuration with redundancy or not (S402).

The RAID configuration with redundancy refers to a configuration capable of correctly reading data even if trouble occurs with one or a plurality of hard disk drives 80 making up the RAID group 82. For example, in the case of the RAID5, when trouble occurs with one hard disk drive 82 out of a plurality of hard disk drives 80 making up the RAID group 82, it is possible to reconstruct the data stored in the hard disk drive 82 with the trouble using the remaining hard disk drives 82 with no trouble. However, when trouble occurs with one hard disk drive 80 out of the plurality of hard disk drives 80 making up the RAID group 82, RAID0 cannot read data correctly, and therefore RAID0 has no redundancy.

When the RAID configuration of the RAID group 82 which has exceeded the power saving wait time has no redundancy, the power saving mode execution section 202 terminates the processing without changing the operating mode of the hard disk drives 80.

When the RAID configuration of the RAID group 82 which has exceeded the power saving wait time has redundancy, the power saving mode execution section 202 starts processing of setting a number of the hard disk drives 80 corresponding to this redundancy to a power saving mode. Here, the number according to the redundancy refers to a maximum number of the hard disk drives 80 without which it is possible to correctly read data using the remaining hard disk drives 80. When there are a plurality of candidate hard disk drives 80 which can be set to a power saving mode, the communication path selection section 203 selects a communication path 81 to which the hard disk drives 80 to be set to a power saving mode are connected (S403). In this case, the communication path selection section 203 refers to the communication path numbers of the hard disk drives 80 stored in the RAID group control table 301 and set to a power saving mode and selects a communication path 81 to which the least number of hard disk drives 80 in a power saving mode are connected. The power saving mode execution section 202 changes the operating mode of a number of the hard disk drives 80 according to the redundancy connected to the selected communication path 81 to a power saving mode (S404). The power saving mode execution section 202 registers the mounting position, communication path number of the hard disk drive 80 set to a power saving mode and the time at which the power saving mode is set in the RAID group control table (S405).

Here, the hard disk drives 80 can be set to a power saving mode by stopping the spinning of the spindle of the hard disk drives 80 or changing the operating mode from active to idle, standby or sleep, etc.

==READ Processing Flow==

Figure 5:
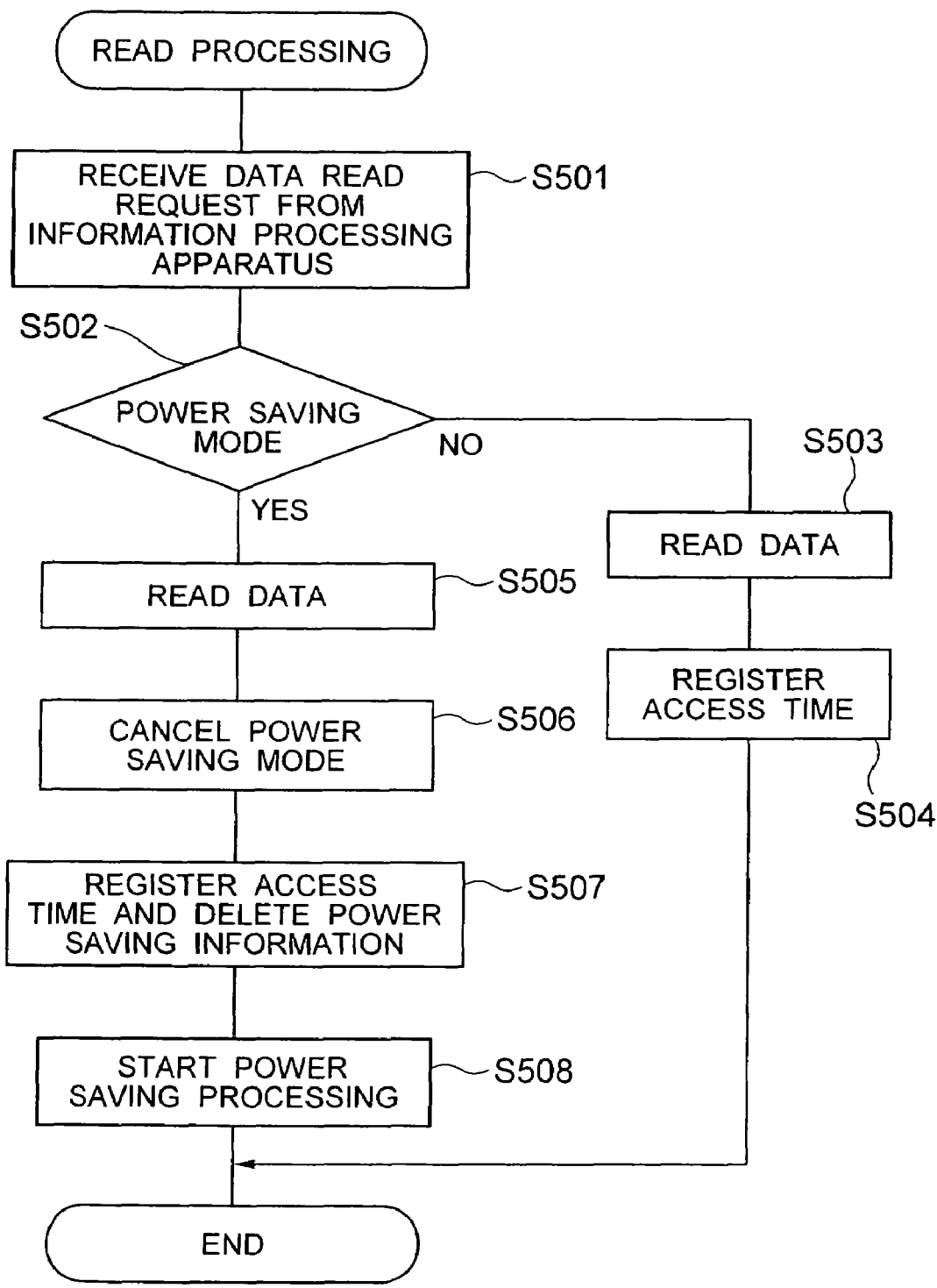
FIG. 5 is a flow chart showing READ processing according to the first embodiment.

FIG. 5 is a flow chart showing a processing flow when a data read request is received from the information processing apparatus 20.

When the host interface 40 receives a data read request from the information processing apparatus 20 (S501), the read request responding section 204 checks whether the RAID group 82 to which the logical volume 83, the target of the read request, belongs is in a power saving mode or not (S502).

When the RAID group 82 is not set to a power saving mode, the read request responding section 204 reads the requested data from the hard disk drive 80 (S503) and sends the read data to the information processing apparatus 20. The access time storage section 201 registers the current time acquired from the time counting mechanism 16 as the access time of the RAID group control table 301 (S504) and terminates the processing.

Then, the processing when the RAID group 82 to which the logical volume 83, the target of the read request, belongs is in a power saving mode will be explained. The read request responding section 204 reads data from the hard disk drives 80 not in a power saving mode using the redundancy of the RAID (S505). The read request responding section 204 sends the read data to the information processing apparatus 20. Then, the power saving mode cancellation section 205 cancels the power saving mode of the hard disk drives 80 in a power saving mode (S506). The access time storage section 201 registers the current time acquired from the time counting mechanism 16 as the access time in the RAID group control table 301. The power saving mode cancellation section 205 deletes the mounting position, communication path number and power saving start time which constitute power saving information (S507). Then, the power saving mode cancellation section 205 starts power saving processing on the RAID group 82, the target of the read request (S508).

The power saving mode of the hard disk drives 80 can be canceled by restarting the spinning of the stopped spindle or changing the operating mode to an active mode, etc.

==WRITE Processing Flow==

Figure 6:
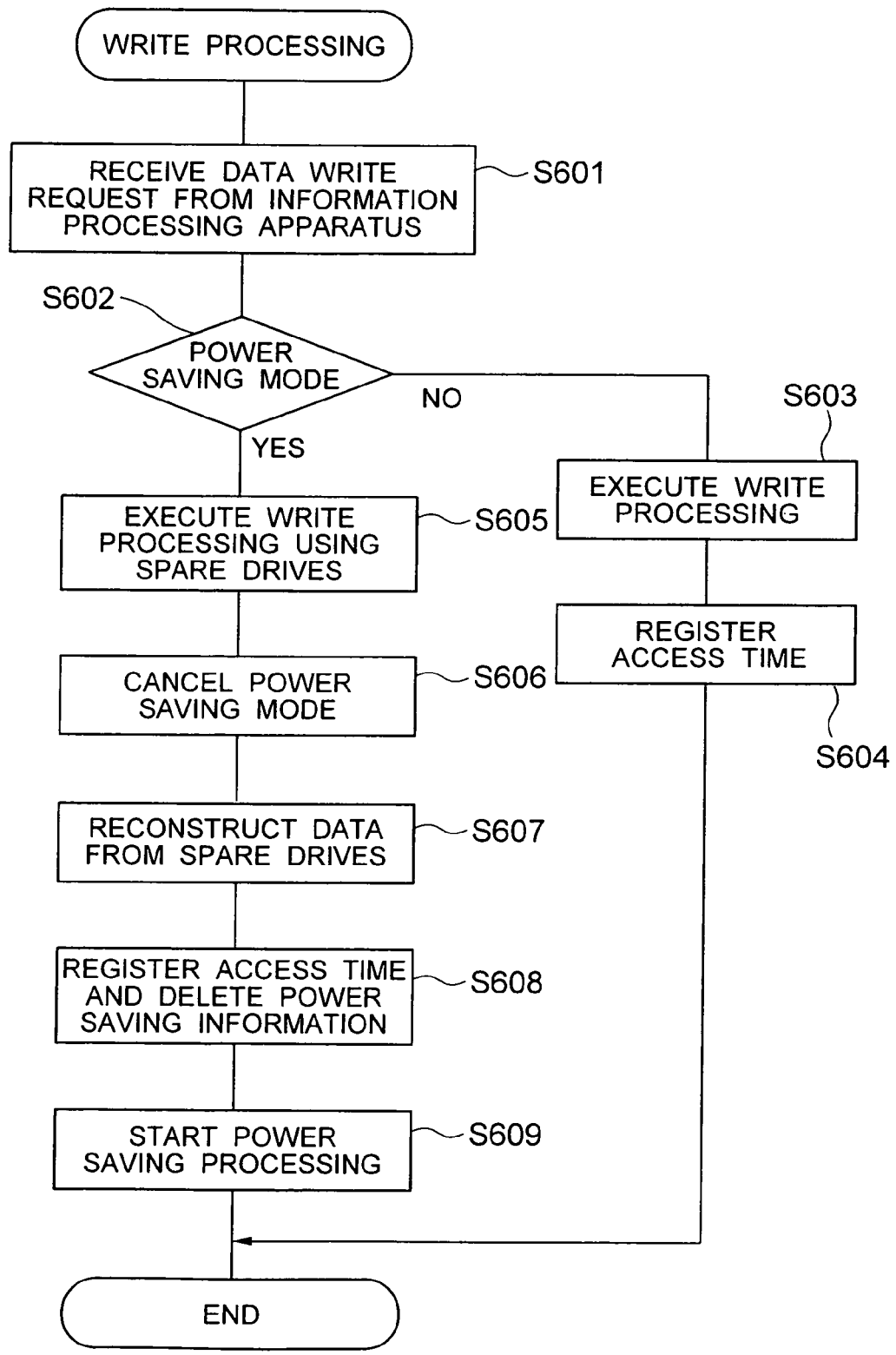
FIG. 6 is a flow chart showing WRITE processing using spare drives according to the first embodiment.

FIG. 6 is a flow chart showing a processing flow when a data write request is received from the information processing apparatus 20.

When the host interface 40 receives the data write request from the information processing apparatus 20 (S601), the write request responding section 207 checks whether the RAID group 82 to which the logical volume 83, the target of the write request, belongs is in a power saving mode or not (S602).

When the RAID group 82 is not in the power saving mode, the write request responding section 207 executes WRITE processing of writing data in the hard disk drives 80 making up the logical volume 83 (S602) and notifies the information processing apparatus 20 of the completion of the write processing. The access time storage section 201 registers the current time acquired from the time counting mechanism 16 as the access time in the RAID group control table 301 (S604) and terminates the processing.

Then, the processing when the RAID group 82 to which the logical volume 83, the target of the write request, belongs is in a power saving mode will be explained. Here, in the power saving processing in FIG. 4, suppose the spare drive storage section 206 stores duplicates of the data stored in the hard disk drives 80 in the spare drives 85 before the power saving mode execution section 202 sets the hard disk drives 80 to a power saving mode (S404).

The write request responding section 207 executes WRITE processing of writing data in the hard disk drives 80 making up the logical volume 83 not in a power saving mode and the spare drives 85 (S605) and notifies the information processing apparatus 20 of the completion of the write processing.

The power saving mode cancellation section 205 cancels the power saving mode of the hard disk drive 80 in a power saving mode (S606). The power saving mode cancellation section 205 reconstructs the duplicates of the data stored in the spare drives 85 in the hard disk drives 80 whose power saving mode has been canceled (S607). It is also possible for the position information storage section 208 to store the position information of the data written in the spare drives 85 by the write request responding section 207 in the cache memory 60. In this case, when the data is reconstructed from the spare drives 85 to the hard disk drives 80 (S607), the power saving mode cancellation section 205 can reconstruct only the data indicated by the position information stored in the cache memory 60 to the hard disk drives 80. The access time storage section 201 registers the current time acquired from the time counting mechanism 16 as the access time in the RAID group control table 301. The power saving mode cancellation section 205 deletes the power saving information (S608). Then, the power saving mode cancellation section 205 starts power saving processing for the RAID group 82, the target of the write request (S609).

In FIG. 6, the method of using the spare drives 85 when a request for a write to the hard disk drives 80 in a power saving mode is received has been explained, but there is also a method not using any spare drives 85. This method will be explained using the flow chart in FIG. 7.

Figure 7:
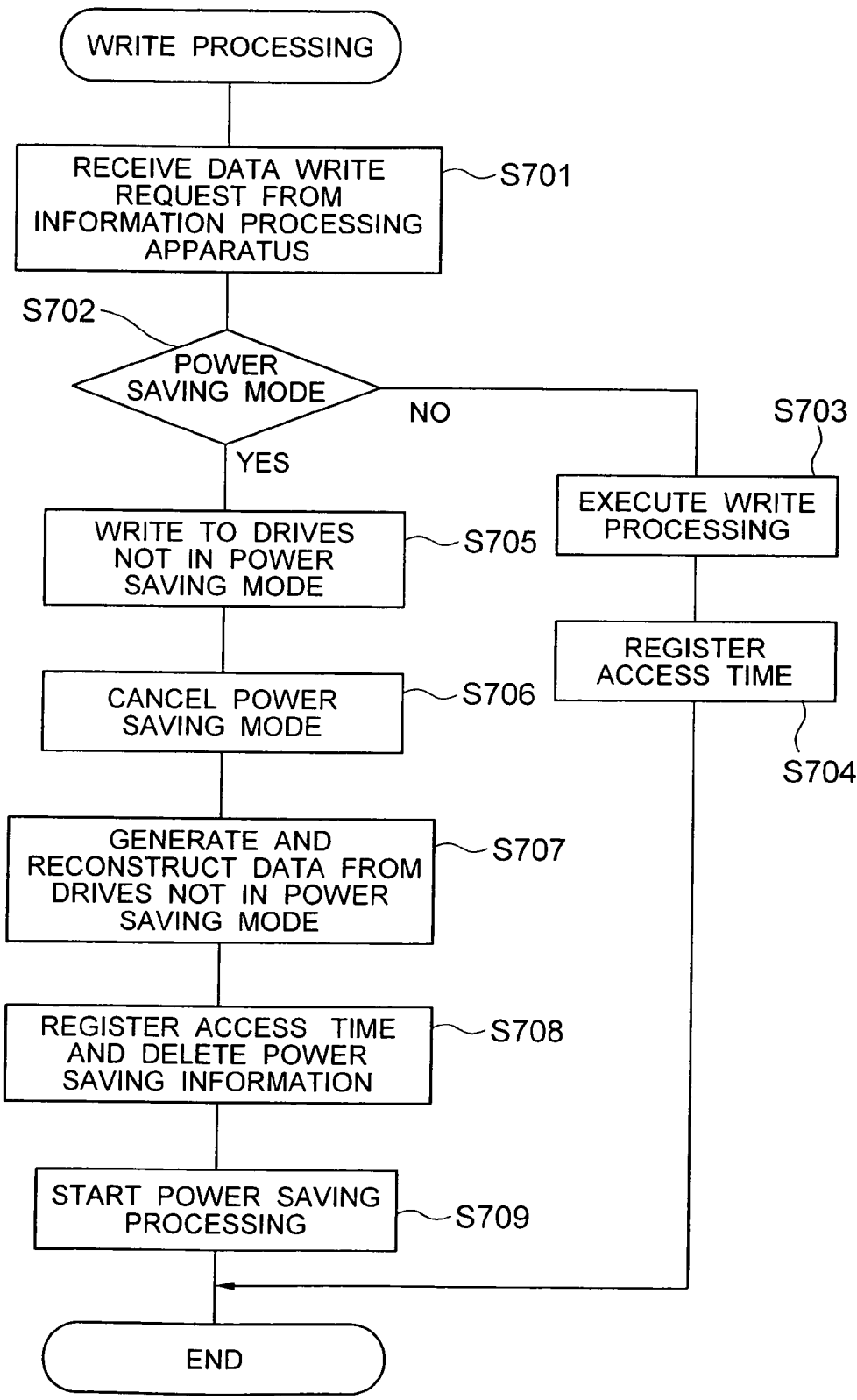
FIG. 7 is a flow chart showing WRITE processing without using any spare drives according to the first embodiment.

The processing from S701 to S704 in FIG. 7 is the same as the processing from S601 to S604 in FIG. 6. The processing when the RAID group 82 to which the logical volume 83, the target of the write request, belongs is in a power saving mode will be explained.

The write request responding section 207 executes WRITE processing of writing data in the hard disk drives 80 not in a power saving mode making up the logical volume 83 (S705) and notifies the information processing apparatus 20 of the completion of the write processing.

The power saving mode cancellation section 205 cancels the power saving mode of the hard disk drives 80 in a power saving mode (S706). The power saving mode cancellation section 205 generates data to be stored in the hard disk drives 80 in a power saving mode from the data stored in the hard disk drives 80 which are not in a power saving mode and reconstructs the generated data in the hard disk drives 80 whose power saving mode has been canceled (S707).

It is also possible to allow the position information storage section 208 to store the position information of the data which is originally supposed to be written when the hard disk drives 80 are in a power saving mode in the cache memory 60. In this case, when the data is reconstructed from the hard disk drives 80 not in a power saving mode (S707), the power saving mode cancellation section 205 can reconstruct only the data indicated by the position information stored in the cache memory 60 in the hard disk drives 80. The access time storage section 201 registers the current time acquired from the time counting mechanism 16 as the access time in the RAID group control table 301. The power saving mode cancellation section 205 deletes the power saving information (S708). Then, the power saving mode cancellation section 205 starts power saving processing for the RAID group 82, the target of the write request (S709).

The power saving processing, READ processing and WRITE processing have been explained so far.

In the aforementioned power saving processing, when there is no access request such as a request for a data write to the logical volume 83 formed in the RAID group 82 for a predetermined period of time, a number of the hard disk drives 80 according to the redundancy of the RAID group 82 are set to a power saving mode. From this, it is possible to obtain a power saving effect without considerably deteriorating the performance of access from the information processing apparatus 20 to the hard disk drives 80.

Furthermore, the aforementioned READ processing reads data using the hard disk drives 80 not in a power saving mode and then cancels the power saving mode of the hard disk drives 80 in a power saving mode. Thus, by canceling the power saving mode of the hard disk drives 80 following a response to an access request, it is possible to quickly perform processing accompanying the subsequent read requests or write requests.

Furthermore in the WRITE processing shown in FIG. 6, data to be written in the hard disk drives 80 in a power saving mode is written in the spare drives 85 and the information processing apparatus 20 thereby receives a response that the writing has been completed. Then, the power saving mode of the hard disk drives 80 in a power saving mode is canceled and the data stored in the spare drives 85 is written in the hard disk drives 80. This allows the information processing apparatus 20 to complete data write processing without waiting until the power saving mode of the hard disk drives 80 in a power saving mode is canceled, which prevents a reduction of the performance of accessing the hard disk drives 80 from the information processing apparatus 20. The position information of the data written in the spare drives 85 is stored, and it is thereby possible to reconstruct only the data written in the spare drives 85 while the hard disk drives 80 are in a power saving mode in the hard disk drives 80. This can shorten the time for reconstructing the hard disk drives 80 when the power saving mode of the hard disk drives 80 is canceled.

Furthermore, in the WRITE processing shown in FIG. 7, data is written in only the hard disk drives 80 not in a power saving mode out of the RAID group 82 and the information processing apparatus 20 is thereby notified that the writing has been completed. Then, the power saving mode of the hard disk drives 80 in a power saving mode is canceled and data is reconstructed in the hard disk drives 80 whose power saving mode has been canceled using the redundancy of the RAID. As with the WRITE processing in FIG. 6, this allows the information processing apparatus 20 to complete the data write processing without waiting until the power saving mode of the hard disk drives 80 in a power saving mode is canceled. In this way, it is possible to prevent the performance of accessing the hard disk drives 80 from the information processing apparatus 20 from deteriorating. It is also possible to store the position information of the data which is originally supposed to be written in the hard disk drives 80 while the hard disk drives 80 are in a power saving mode. For this reason, it is possible to reconstruct the data in the hard disk drives 80 which has been in a power saving mode only from the data written in the other hard disk drives 80 of the RAID group 82 while the hard disk drives 80 are in a power saving mode. When the power saving mode of the hard disk drives 80 is canceled, it is possible to shorten the time of reconstructing the hard disk drives 80.

Furthermore, when the hard disk drives 80 to be set to a power saving mode are selected, the communication path selection section 203 selects a communication path 81 having the least number of hard disk drives 80 in a power saving mode connected to the communication path 81. For this reason, the number of hard disk drives in a power saving mode of each communication path 81 is equalized. This prevents extreme biases from occurring in the data traffic in each communication path 81 producing noticeable differences in access performance among communication paths 81.

2. Second Embodiment

Then, a second embodiment of the present invention will be explained. The hardware configuration including a disk array apparatus according to the second embodiment is similar to that shown in FIG. 1 explained in the first embodiment. In the second embodiment, a disk array apparatus 10 includes hard disk drives 80 which are first hard disk drives whose interface standard is a fiber channel and hard disk drives 80 which are second hard disk drives whose interface standard is a serial ATA. However, the interface standard is not limited to the above described standards if the life of the second hard disk drives is at least shorter than the life of the first hard disk drives.

First, a mode of connection between a disk interface 50 and hard disk drives 80 will be explained.

Figure 8:
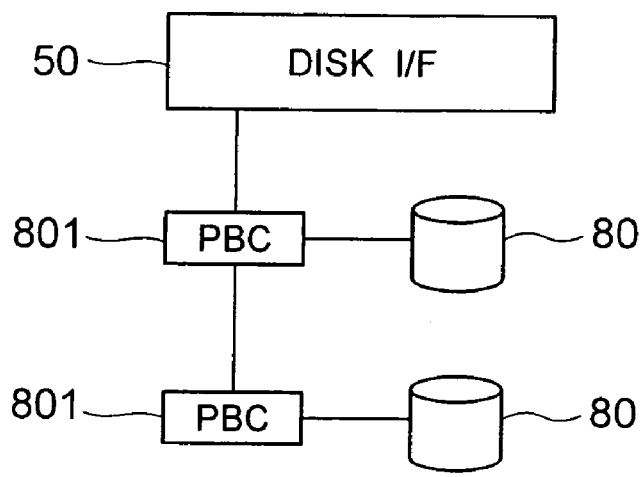
FIG. 8 illustrates a connection mode of fiber channel hard disk drives according to the first embodiment.

FIG. 8 shows a connection mode when the interface standard of the hard disk drives 80 is a fiber channel. When communication paths 81 are FC-AL, a plurality of PBCs (Port Bypass Circuits) 801 are provided. The PBC 801 provides a function of connecting the disk interface 50 and hard disk drives 80 whose interface standard is a fiber channel. Furthermore, the PBC 801 also has the function of separating the hard disk drives 80 having trouble from the FC-AL allowing the disk interface 50 to communicate with other hard disk drives 80.

Figure 9:
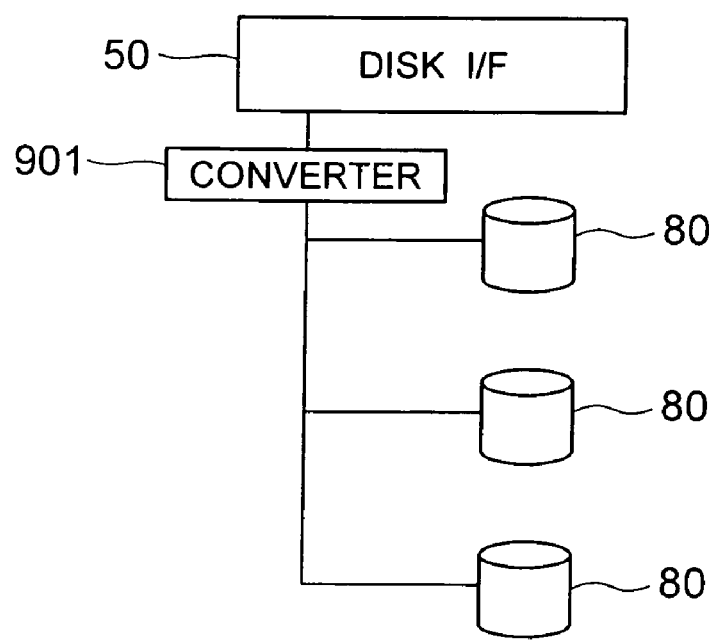
FIG. 9 illustrates a first connection mode of serial ATA hard disk drives according to the first embodiment.

FIG. 9 illustrates an example of a connection mode when the interface standard of the hard disk drives 80 is other than the fiber channel such as a serial ATA standard. Since it is impossible to connect the hard disk drives 80 of the interface standard directly to the FC-AL, a converter 901 is used. The converter 901 is a circuit for converting data or signal in the interface standards of the fiber channel and serial ATA. In the example of FIG. 9, the converter 901 is provided in such a way that all hard disk drives 80 in a basic case 11 or additional case 12 make conversions from the fiber channel to serial ATA. Therefore, in the case in which the converter 901 is provided, all hard disk drives 80 have the interface standard of serial ATA.

Figure 10:
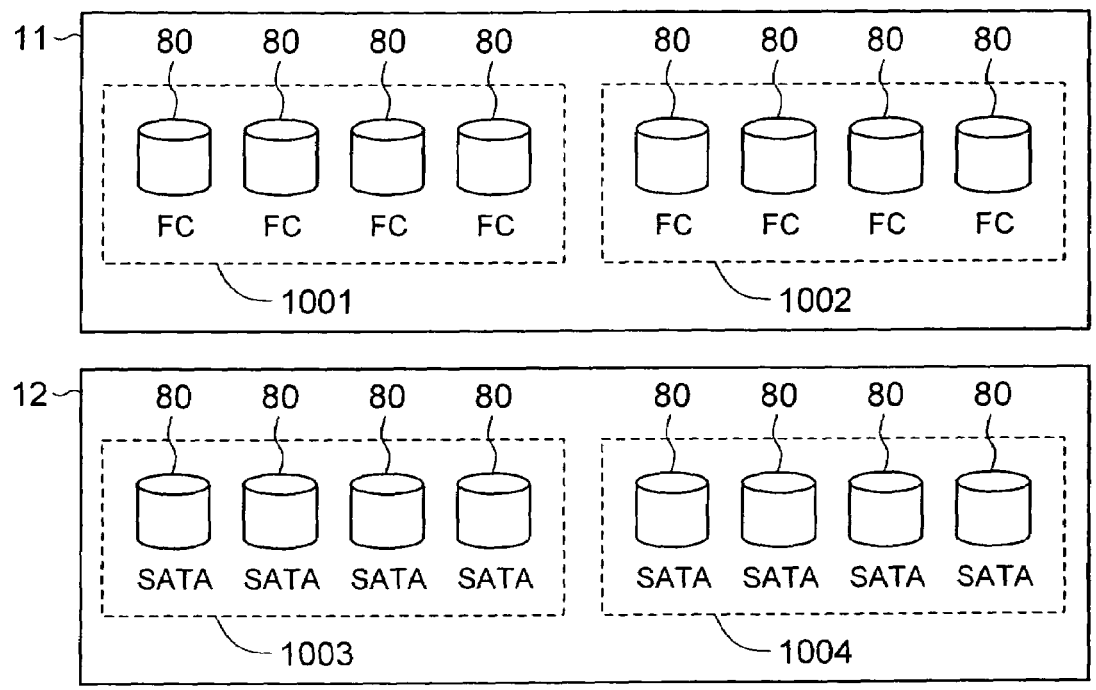
FIG. 10 illustrates a configuration example of a RAID group when the converter is placed in the additional case according to the first embodiment as shown in FIG. 9.

FIG. 10 illustrates a configuration example of a RAID group 82 when the converter 901 is provided in the additional case 12 as shown in FIG. 9. In the basic case 11, RAID groups 1001 and 1002 made up of fiber channel hard disk drives 80 are formed. Since the converter 901 is provided in the additional case 12, RAID groups 1003 and 1004 made up of serial ATA hard disk drives 80 are formed.

Figure 11:
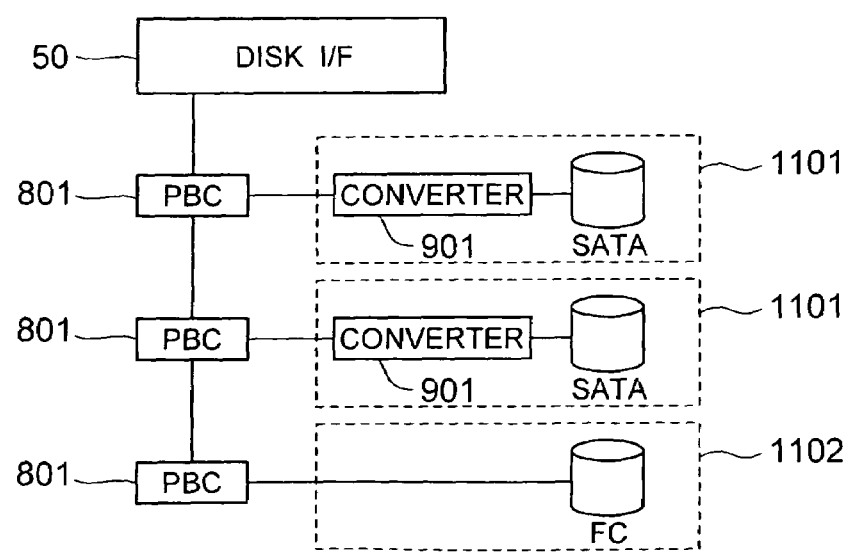
FIG. 11 illustrates a second connection mode of serial ATA hard disk drives according to the first embodiment.

FIG. 11 illustrates another example of connecting hard disk drives 80 of any standard other than the fiber channel standard such as a serial ATA standard. As with FIG. 8, a plurality of PBCs 801 are connected to the FC-AL. The serial ATA hard disk drive 1101 is provided with a converter 901 and the converter 901 is connected to the PBC 801. This allows the serial ATA hard disk drive 1101 to transfer data and signal to/from the disk interface 50. Furthermore, in this connection mode, it is also possible to connect a hard disk drive 1102 of a fiber channel standard.

FIG. 12 illustrates a configuration example of a RAID group 82 when the converter 901 is provided as shown in FIG. 11. In the basic case 11, RAID groups 1201 and 1202 are formed and the RAID group 1201 consists of only fiber channel hard disk drives 80 and the RAID group 1202 consists of only serial ATA hard disk drives 80. Furthermore, in the additional case 12, RAID groups 1203 and 1204 are formed, each of which consists of a mixture of fiber channel hard disk drives 80 and serial ATA hard disk drives 80. In this way, when the converter 901 is provided as shown in FIG. 11, it is possible to mix fiber channel hard disk drives 80 and serial ATA hard disk drives 80 in one case or one RAID group 82.

FIG. 13 is a block diagram showing functions of a controller 13 according to the second embodiment. The controller 13 is provided with an access time storage section 1301, a power saving mode execution section 1302, a power saving start time storage section 1303, a power saving mode cancellation section 1304, a continuous operation time storage section 1305, a batch spare execution section 1306, an accumulated operation time storage section 1307, a load time storage section 1308, an unload execution section 1309, an error count storage section 1310, a dynamic spare execution section 1311, a read request responding section 1312, a spare drive storage section 1313, a write request responding section 1314, a position information storage section 1315 and an upper limit check section 1316. The sections 1301 to 1316 are implemented by a CPU 14 of the controller 13 executing a program stored in a memory 15.

The continuous operation time storage section 1305 stores a continuous operation time in the RAID group control table 1401 for each RAID group 82. The continuous operation time for each RAID group 82 is a time during which the hard disk drives 80 which belong to the RAID group 82 continuously operate without being set to a power saving mode.

The accumulated operation time storage section 1307 stores an accumulated operation time for each hard disk drive 80 in the hard disk drive control table 1402. The accumulated operation time for each hard disk drive 80 is an accumulation of time segments during which each hard disk drive 80 operates without being set to a power saving mode.

When the head operation system of the hard disk drives 80 is a load/unload system, the load time storage section 1308 acquires the current time from the time counting mechanism 16 when the head is loaded on the magnetic disk and stores it in a hard disk drive control table 1402.

The error count storage section 1310 stores the count of errors which have occurred in the hard disk drives 80 in the hard disk drive control table 1402 for each hard disk drive 80.

FIG. 14 illustrates a RAID group control table 1401, a hard disk drive control table 1402, a power saving control table 1403, a spare control table 1404, an unload wait time 1405, an upper limit control table 1406 and an error control table 1407 stored in the memory 15.

The RAID group control table 1401 includes fields like "setting RAID", "control LUN", "power saving start time" and "access time" as in the case of the first embodiment. The contents set in these fields are the same as those of the first embodiment.

The RAID group control table 1401 further includes fields "drive type", "usage mode" and "continuous operation time." The "drive type" field sets information on the interface standard of the hard disk drives 80 making up the RAID group 82. In this embodiment, "FC" is set when the interface standard of all the hard disk drives 80 which belong to the RAID group 82 is a fiber channel and "SATA" is set when the interface standard of all the hard disk drives 80 which belong to the RAID group 82 is a serial ATA. Furthermore, as shown in FIG. 12, "mixed" is set when the interface of the hard disk drives 80 which belong to the RAID group 82 is a mixture of a fiber channel and serial ATA. The "usage mode" field sets the usage mode for each RAID group 82.

The usage mode indicates whether the RAID group 82 is used or not for processing in which the access performance of a key task, etc., is very important or whether the RAID group 82 is used or not for processing in which deterioration of the access performance such as backup processing causes no significant problem. In this embodiment, the usage mode in a key task is expressed as "on-line" and the usage mode in backup processing, etc., is expressed as "near line."

The hard disk drive control table 1402 is intended to control information for each hard disk drive 80 and includes fields "setting RAID", "drive number", "load time", "accumulated operation time", "unload count" and "error count."

The "setting RAID" field sets the RAID group 82 to which the hard disk drives 80 belong. The "drive number" field sets the number indicating the hard disk drive 80. The "load time" field sets the time at which the head is loaded on the magnetic disk registered by the load time storage section 1308. The "accumulated operation time" field sets the accumulated operation time for each hard disk drive 80 registered by the accumulated operation time storage section 1307. The "unload count" field stores the number of times the head is unloaded in the hard disk drives 80. The "error count" field stores the count of errors such as write errors in the hard disk drives 80 registered by the error count storage section 1310.

The power saving control table 1403 includes "power saving wait time" and "power saving time" fields. The "power saving wait time" field sets the time until the hard disk drives 80 are set to a power saving mode as in the case of the first embodiment. The "power saving time" field sets the time until the power saving mode of the hard disk drives 80 in a power saving mode is canceled.

The spare control table 1404 includes "spare wait time" and "spare time" fields. The "spare wait time" field sets the wait time for each RAID group 82 after the data stored in the hard disk drives 80 is copied to the spare drives 85 until all the hard disk drives 80 of the RAID group 82 are set to a power saving mode. The "spare time" field sets the time until the power saving mode of the hard disk drives 80 in a power saving mode is canceled using the spare drives 85.

The unload wait time 1405 sets the wait time after the load time at which the head is loaded on the magnetic disk of the hard disk drives 80 until the head is unloaded. The upper limit control table 1406 is provided with "upper limit operation time" and "upper limit unload count" fields. When the accumulated operation time or unload count for each hard disk drive 80 stored in the hard disk drive control table 1402 exceeds the upper limit operation time or upper limit unload count set in the upper limit control table 1406, a request for replacing the hard disk drives 80 is sent to the control terminal 90.

The error control table 1407 includes "operation time" and "upper limit error count" fields. The "operation time" field sets the range of the accumulated operation time in the hard disk drives 80 and the "upper limit error count" field sets the upper limit value of an error count corresponding to the operation time. When the error count of the hard disk drives 80 exceeds the upper limit error count corresponding to the operation time set in the error control table 1407, dynamic spare processing which will be described later is carried out for the hard disk drives 80.

==Power Saving Processing Flow==

Figure 15:
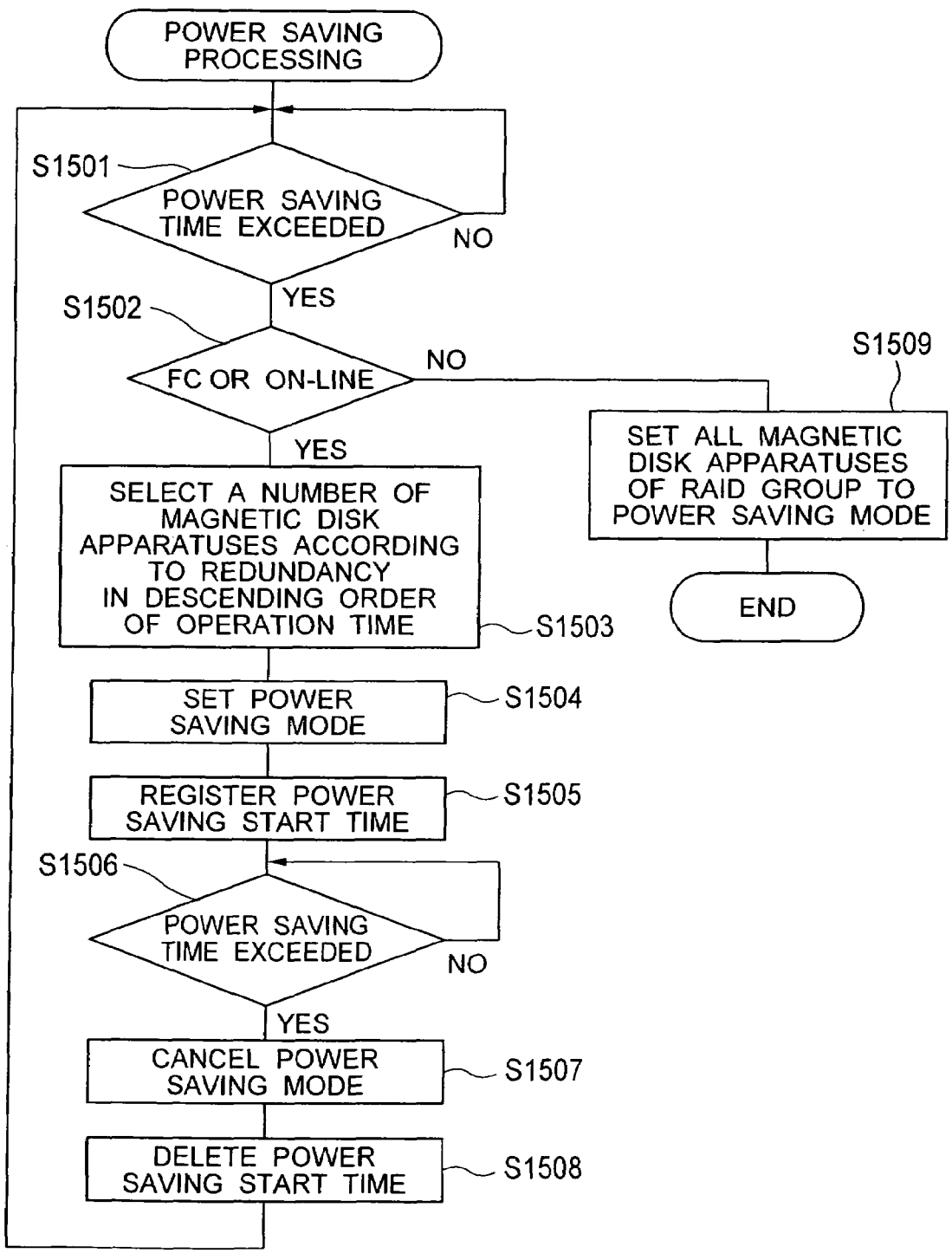
FIG. 15 is a flow chart showing power saving processing according to the second embodiment.

FIG. 15 is a flow chart showing power saving processing executed by the CPU 14. The power saving processing is carried out for each RAID group 82.

Concerning the RAID group 82 as the target, the power saving mode execution section 1302 monitors whether the difference between the access time registered in the RAID group control table 1401 and the current time acquired from the time counting mechanism 16 exceeds the power saving wait time set in the power saving control table 1403 or not (S1501). When the power saving wait time is exceeded, the power saving mode execution section 1302 checks whether the drive type of the RAID group 82 is "FC" or the usage mode is "on-line" (S1502).

When the drive type is "FC" or the usage mode is "on-line," the power saving mode execution section 1302 selects a number of hard disk drives 80 according to the redundancy of the RAID group 82 with reference to the hard disk drive control table 1402 and giving priority to those having a long accumulated operation time (S1503). The power saving mode execution section 1302 sets the selected hard disk drives 80 to a power saving mode (S1504). The power saving start time storage section 1303 registers the current time acquired from the time counting mechanism 16 as the power saving start time in the RAID group control table 1401 (S1505). The power saving mode cancellation section 1304 monitors whether the difference between the power saving start time and the current time acquired from the time counting mechanism 16 exceeds the power saving time set in the power saving control table 1403 or not (S1506). When the power saving time is exceeded, the power saving mode cancellation section 1304 cancels the power saving mode of the hard disk drives 80 in a power saving mode (S1507) and deletes the power saving start time of the RAID group control table 1401 (S1508). When the drive type is "FC" or the usage mode is "on-line," a series of processes of selecting the hard disk drives 80 with a long accumulated operation time and setting them to a power saving mode (S1503 to S1508) is executed repeatedly.

When the drive type is other than "FC" and the usage mode is "near line," the power saving mode execution section 1302 sets an arbitrary number of the hard disk drives 80 to a power saving mode independently of the redundancy of the RAID group 82. In this embodiment, the power saving mode execution section 1302 sets all the hard disk drives 80 which belong to the RAID group 82 to a power saving mode (S1509). Here, not all the hard disk drives 80 which belong to the RAID group need to be set to a power saving mode.

==READ Processing Flow==

Figure 16:
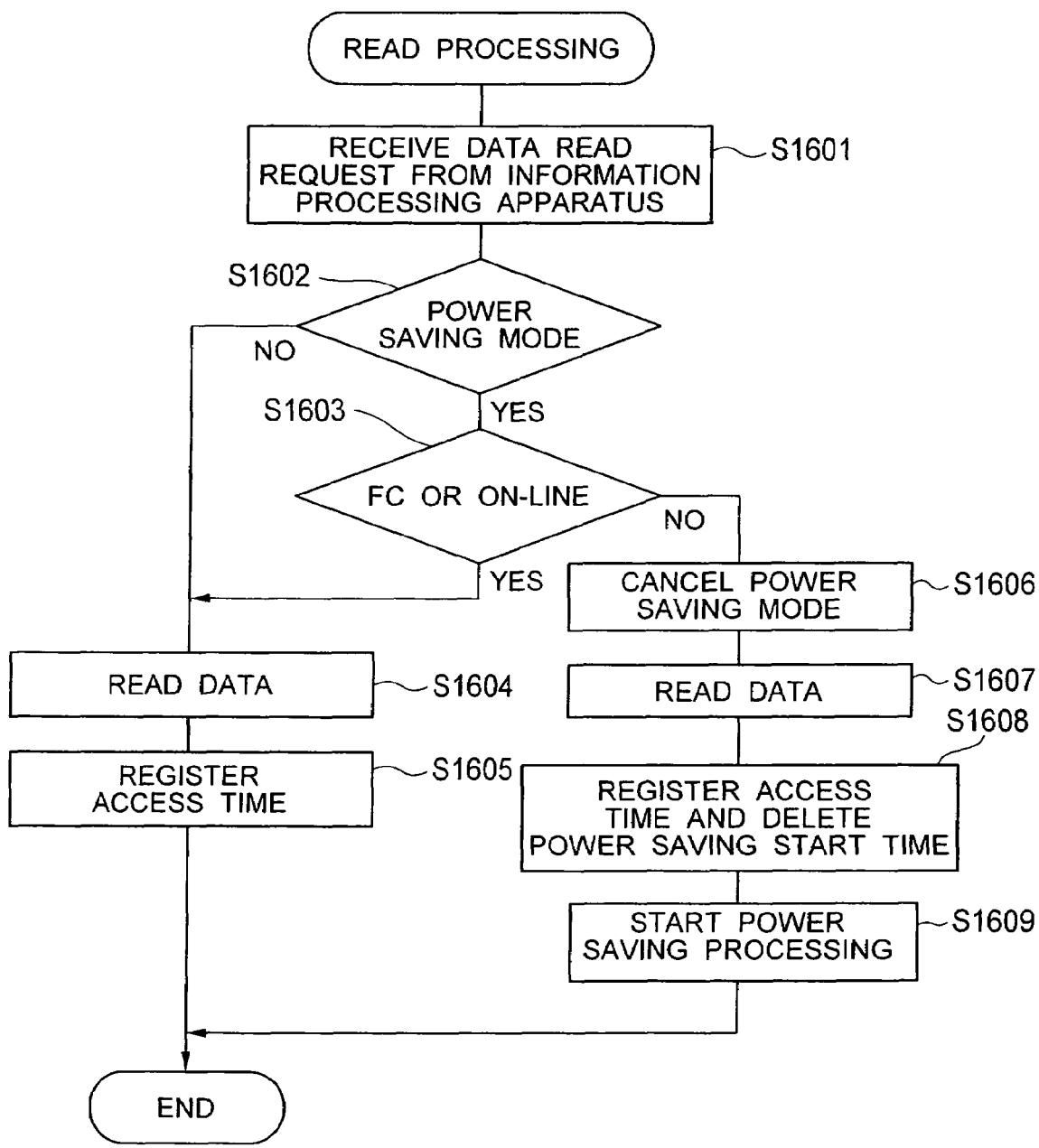
FIG. 16 is a flow chart showing READ processing according to the second embodiment.

FIG. 16 is a flow chart showing a processing flow when a data read request is received from the information processing apparatus 20.

When the host interface 40 receives a data read request from the information processing apparatus 20 (S1601), the read request responding section 1312 refers to the RAID group control table 1401 and checks whether the RAID group 82 to which the logical volume 83, the target of the read request, belongs is set to a power saving mode or not (S1602). When the RAID group 82 is in a power saving mode, the read request responding section 1312 checks whether the drive type of the RAID group 82 in a power saving mode is "FC" or not or the usage mode is "on-line" or not (S1603).

When the RAID group 82 is not in a power saving mode or when it is in a power saving mode but the drive type is "FC" or the usage mode is "on-line," the read request responding section 1312 reads data from the hard disk drives 80 not in a power saving mode (S1604) and sends the data to the information processing apparatus 20. Then, the read request responding section 1312 registers the current time acquired from the time counting mechanism 16 as the access time in the RAID group control table 1401 (S1605) and terminates the processing.

Then, the processing when the RAID group 82 to which the logical volume 83, the target of the read request, belongs is in a power saving mode and the drive type is not "FC" and the usage mode is not "on-line" will be explained. In this case, all the hard disk drives 80 which belong to the RAID group 82 are in a power saving mode. Therefore, the read request responding section 1312 cancels the power saving mode of these hard disk drives 80 (S1606). Then, the read request responding section 1312 reads data from the hard disk drives 80 whose power saving mode has been canceled (S1607) and sends the data to the information processing apparatus 20. The access time storage section 1312 registers the current time acquired from the time counting mechanism 16 as the access time in the RAID group control table 1401. The read request responding section 1312 deletes the power saving start time (S1608). Then, the read request responding section 1312 starts power saving processing for the RAID group, the target of the read request (S1609).

==WRITE Processing Flow==

Figure 17:
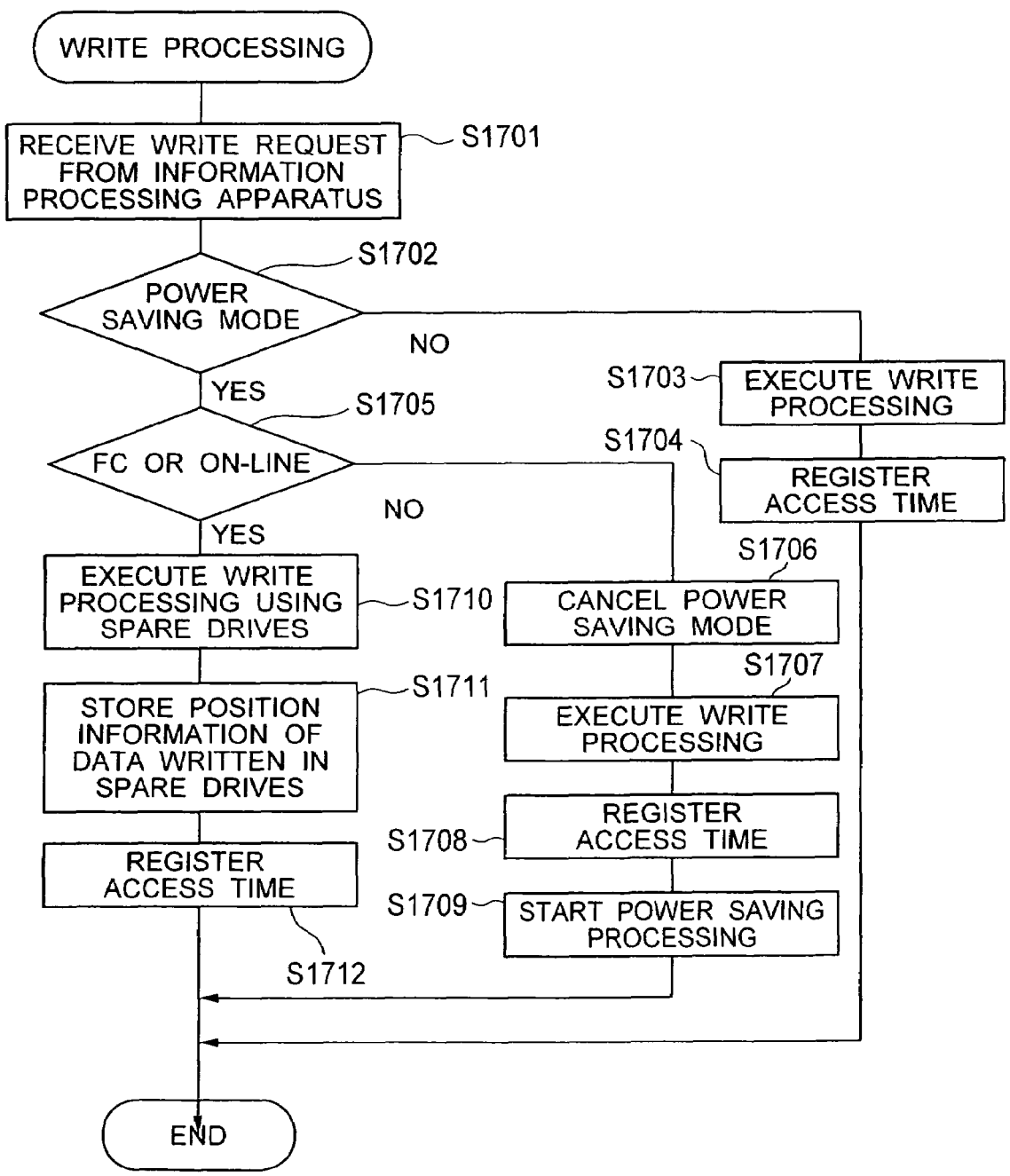
FIG. 17 is a flow chart showing WRITE processing using spare drives according to the second embodiment.

FIG. 17 is a flow chart showing a processing flow when a data write request is received from the information processing apparatus 20.

When the host interface 40 receives a data write request from the information processing apparatus 20 (S1701), the write request responding section 1314 checks whether the RAID group 82 to which the logical volume 83, the target of the write request, belongs is in a power saving mode or not (S1702).

When the RAID group 82 is not in a power saving mode, the write request responding section 1314 executes WRITE processing of writing data in the hard disk drives 80 making up the logical volume 83 (S1703) and notifies the information processing apparatus 20 of the completion of the write processing. The access time storage section 1301 registers the current time acquired from the time counting mechanism 16 as the access time in the RAID group control table 1401 (S1704) and terminates the processing.

The processing when the RAID group 82 to which the logical volume 83, the target of the write request, belongs is in a power saving mode will be explained. The write request responding section 1314 checks whether the drive type of the RAID group 82 in a power saving mode is "FC" or not or the usage mode is "on-line" or not (S1705).

First, the processing when the drive type of the RAID group 82 to which the logical volume 83, the target of the write request, belongs is not "FC" and the usage mode is not "on-line" will be explained. The write request responding section 1314 cancels the power saving mode of the hard disk drives 80 in a power saving mode (S1706). The write request responding section 1314 executes WRITE processing using the hard disk drives 80 whose power saving mode has been canceled (S1707) and notifies the information processing apparatus 20 of the completion of write processing. The access time storage section 1301 registers the current time acquired from the time counting mechanism 16 as the access time in the RAID group control table 1401. Then, the write request responding section 1314 starts power saving processing on the RAID group (S1709).

Then, the processing when the drive type of the RAID group 82 to which the logical volume 83, the target of the write request, belongs is "FC" or the usage mode is "on-line" will be explained. Here, in the power saving processing in FIG. 15, suppose the spare drive storage section 1313 stores duplicates of the data stored in the hard disk drives 80 in the spare drives 85 before the power saving mode execution section 1302 sets a number of the hard disk drives 80 according to the redundancy of the RAID group 82 to a power saving mode (S1504). The write request responding section 1314 executes WRITE processing of writing data in the hard disk drives 80 making up the logical volume 83 and not in a power saving mode and the spare drives 85 (S1710) and notifies the information processing apparatus 20 of the completion of the write processing. The position information storage section 1315 stores position information on the data written in the spare drives 85 in the cache memory 60 (S1711). The access time storage section 1301 registers the current time acquired from the time counting mechanism 16 as the access time in the RAID group control table 1401 (S1712).

Thus, in the case where the spare drives 85 are used, when the power saving mode is canceled through the power saving processing in FIG. 15 (S1507), the power saving mode cancellation section 1304 reconstructs the data stored in the spare disk 85 in the hard disk drives 80. That is, the power saving mode cancellation section 1304 reconstructs the duplicates of the data stored in the spare disks 85 in the hard disk drives 80 whose power saving mode has been canceled. In this case, the power saving mode cancellation section 1304 may also be adapted so as to reconstruct only the data indicated by the position information stored in the cache memory 60. This makes it possible to shorten the time of reconstructing the data in the hard disk drives 80.

In FIG. 17, the method using the spare drives 85 has been described, but there is also a method not using the spare drives 85. This method will be explained using the flow chart in FIG. 18.

Figure 18:
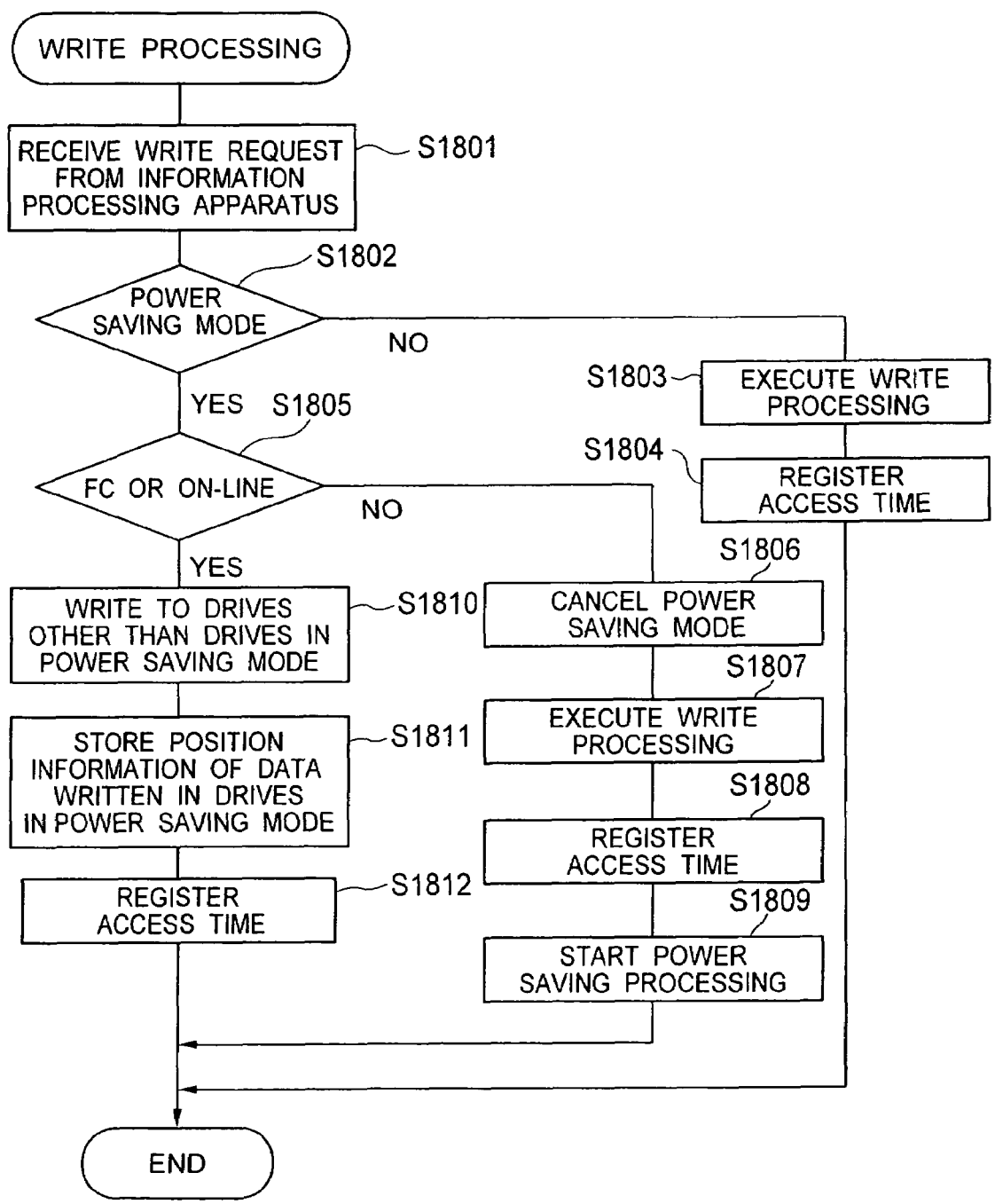
FIG. 18 is a flow chart showing WRITE processing without using any spare drives according to the second embodiment.

The processing from S1801 to S1809 in FIG. 18 is the same as the processing from S1701 to S1709 in FIG. 17.

The processing when the RAID group 82 to which the logical volume 83, the target of the write request, belongs is in a power saving mode and the drive type is "FC" or the usage mode is "on-line", will be explained.

The write request responding section 1314 executes WRITE processing of writing data in the hard disk drives 80 making up the logical volume 83 and not in a power saving mode (S1810) and notifies the information processing apparatus 20 of the completion of the write processing. The position information storage section 1315 stores position information on the data which is originally supposed to be written in the hard disk drives 80 in a power saving mode in the cache memory 60 (S1811). The access time storage section 1301 registers the current time acquired from the time counting mechanism 16 as the access time in the RAID group control table 1401 (S1812).

Thus, when data is written in only the hard disk drives 80 of the RAID group 82 not in a power saving mode, the power saving mode cancellation section 1304 reconstructs the data in the hard disk drives 80 in a power saving mode using the redundancy of the RAID when the power saving mode in FIG. 15 is canceled (S1507). That is, the power saving mode cancellation section 1304 generates the data of the hard disk drives 80 in a power saving mode from the data stored in the hard disk drives 80 of the RAID group not in a power saving mode. Then, the power saving mode cancellation section 1304 stores the data generated in the hard disk drives 80 whose power saving mode has been canceled. In this case, the power saving mode cancellation section 1304 may also be adapted so as to reconstruct only the data indicated by the position information stored in the cache memory 60. This makes it possible to shorten the time of reconstructing the data in the hard disk drives 80.

Power saving processing, READ processing and WRITE processing have been explained so far. The serial ATA hard disk drives 80 have lower reliability and shorter life than the fiber channel hard disk drives 80. However, the serial ATA hard disk drives 80 are less expensive than the fiber channel hard disk drives 80, and therefore their use for tasks other than key tasks is rapidly increasing. Furthermore, for the serial ATA hard disk drives 80, the operation time largely affects the life, and therefore it is possible to extend their service life by reducing the operation time. Thus, as with the aforementioned power saving processing, in the case of the serial ATA hard disk drives 80, by setting more hard disk drives 80 than the fiber channel hard disk drives 80 to a power saving mode, it is possible to extend the life of the entire disk array apparatus 10 made up of the serial ATA hard disk drives 80. As the interface standard, the fiber channel and serial ATA have been explained, but any interface standards can achieve similar effects if their hard disk drives at least have a difference in their life.

Furthermore, the fiber channel hard disk drives 80 are often used for tasks whose access performance is important such as on-line processing of key tasks. For this reason, setting a number of hard disk drives 80 according to the redundancy of the RAID group 82 to a power saving mode allows the power saving effect to be achieved without significantly reducing the access performance. On the other hand, the serial ATA hard disk drives 80 are often used for tasks to which a reduction of access performance is not a great problem such as tasks other than key tasks. For this reason, setting all the hard disk drives 80 making up the RAID group 82 to a power saving mode without depending on the redundancy of the RAID group 82 allows a greater power saving effect to be achieved.

Furthermore, the RAID group 82 made up of a mixture of the fiber channel hard disk drives 80 and serial ATA hard disk drives 80 may also be used for tasks whose access performance is important such as "on-line" processing of key tasks. In this case, setting a number of hard disk drives according to the redundancy of the RAID group 82 to a power saving mode allows the power saving effect to be achieved without drastically reducing the access performance. Furthermore, the RAID group 82 may also be used for tasks to which a reduction of the access performance is not a great problem such as "near line" processing. In this case, setting all the hard disk drives 80 making up the RAID group 82 to a power saving mode without depending on the redundancy of the RAID group 82 allows a greater power saving effect to be achieved.

Furthermore, when a number of the hard disk drives 80 according to the redundancy of the RAID group 82 are set to a power saving mode, the hard disk drives 80 having a long accumulated operation time out of the hard disk drives 80 which belong to the RAID group 82 are set to a power saving mode. In this way, it is possible to reduce variations in the accumulated operation time of the hard disk drives 80 in the RAID group 82 and level out the life of the hard disk drives 80. Furthermore, when the hard disk drives 80 are in a power saving mode, if the state in which there is no read request or write request between the information processing apparatus 20 and the RAID group 82 to which the hard disk drives 80 belong continues, the hard disk drives 80 to be set to a power saving mode at predetermined time intervals are changed in the RAID group 82. In this way, it is possible to suppress variations in the accumulated operation time of the hard disk drives 80 in the RAID group 82 and level out the life of the hard disk drives 80.

==Spare Processing Flow==

Figure 19:
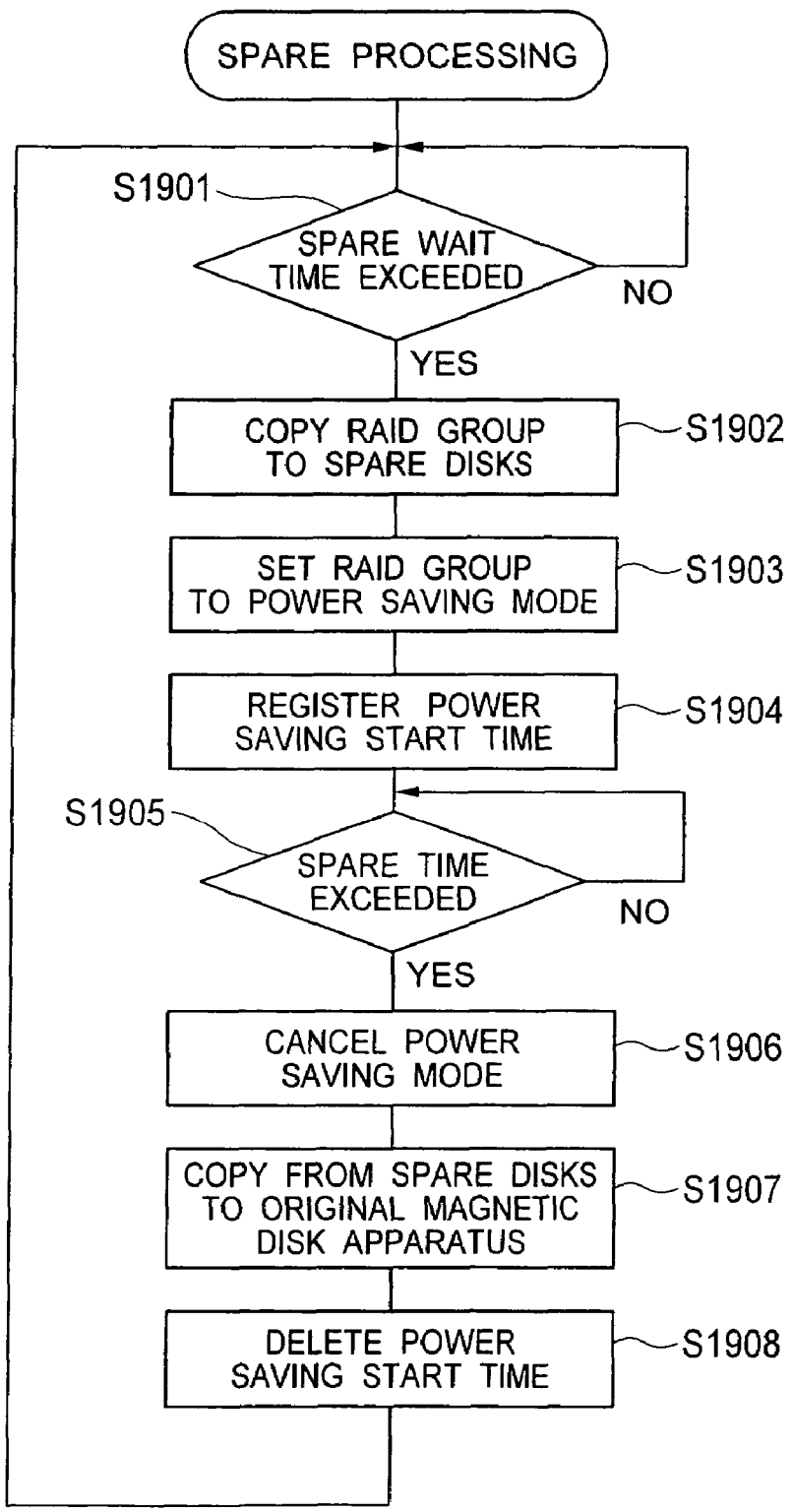
FIG. 19 is a flow chart showing processing of setting hard disk drives to a power saving mode for each RAID group using the spare drives according to the second embodiment.

FIG. 19 is a flow chart showing a processing flow of setting the hard disk drives 80 to a power saving mode for each RAID group using the spare drives 85.

The batch spare execution section 1306 refers to the RAID group control table 1401 and monitors whether there is any RAID group 82 whose continuous operation time exceeds the spare wait time set in the spare control table 1404 (S1901). When there is some RAID group 82 which exceeds the spare wait time, the batch spare execution section 1306 stores duplicates of data stored in all the hard disk drives 80 which belong to the RAID group 82 in the spare drives 85 (S1902). In this condition, when the information processing apparatus 20 issues a request for a read from the RAID group, the read request responding section 1312 executes processing on the read request using the spare drives 85. Likewise, when the information processing apparatus 20 issues a request for a write to the RAID group, the write request responding section 1314 executes the processing on the write request using the spare drives 85.

The batch spare execution section 1306 sets all the hard disk drives 80 which belong to the RAID group 82 to a power saving mode (S1903). The batch spare execution section 1306 registers the current time acquired from the time counting mechanism 16 as the power saving start time in the RAID group control table 1401 (S1904). Then, the batch spare execution section 1306 monitors whether the difference between the power saving start time and current time exceeds the spare time set in the spare control table 1404 or not (S1905). When the spare time is exceeded, the batch spare execution section 1306 cancels the power saving mode of all the hard disk drives 80 of the RAID group 82 (S1906). Then, the batch spare execution section 1306 stores duplicates of the data stored in the spare drives 85 in the hard disk drives 80 of the RAID group 82. The batch spare execution section 1306 deletes the power saving start time of the RAID group control table 1401 (S1907) and restarts to monitor the RAID group 82 which exceeds the spare wait time (S1901).

In this way, by copying data in the spare drives 85 for each RAID group 82 at certain time intervals irrespective of the presence/absence of an access request and then setting the hard disk drives 80 to a power saving mode, it is possible to extend the life of the hard disk drives 80 without reducing the performance of access from the information processing apparatus 20.

==Unload Processing Flow==

Figure 20:
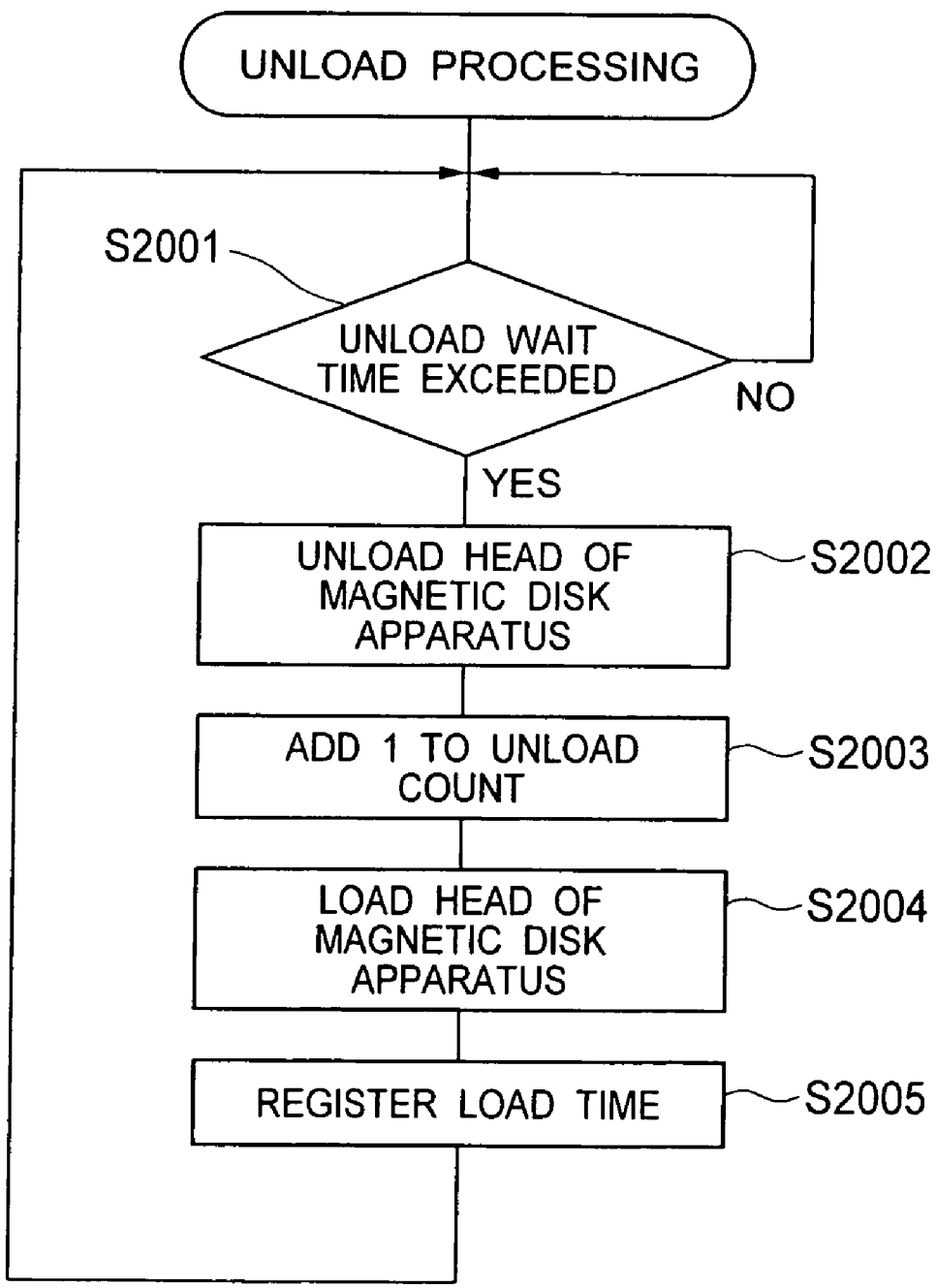
FIG. 20 is a flow chart showing processing of unloading the heads of the hard disk drives according to the second embodiment.

FIG. 20 is a flow chart showing a processing flow of unloading the head of the hard disk drives 80.

The unload execution section 1309 refers to the hard disk drive control table 1402 and monitors if there are any hard disk drives 80 in which the difference between the load time and the current time acquired from the time counting mechanism 16 exceeds the time set in the unload wait time 1405 (S2001). When there are some hard disk drives 80 which exceed the unload wait time, the unload execution section 1309 unloads the head of the hard disk drives 80 (S2002). The unload execution section 1309 increments the unload count of the hard disk drives 80 by 1 in the hard disk drive control table 1402 (S2003). Then, the unload execution section 1309 reloads the head of the hard disk drives 80 (S2003). The load time storage section 1308 registers the current time acquired from the time counting mechanism 16 as the load time in the hard disk drive control table 1402 (S2004).

When the hard disk drives 80 are in operation, the head for reading/writing data is positioned above a spinning magnetic disk with a space of approximately several ten nm. When the magnetic disk is spinning, grooves are produced in a lubricant on the surface of the magnetic disk due to a wind pressure from the head. For this reason, in the case of the load/unload system hard disk drives 80, it is possible to unload the head at certain time intervals, smooth projections and depressions of the lubricant on the surface of the magnetic disk and reduce the possibility that the magnetic disk may be damaged by external shock, etc.

==Upper Limit Check Processing Flow==

Figure 21:
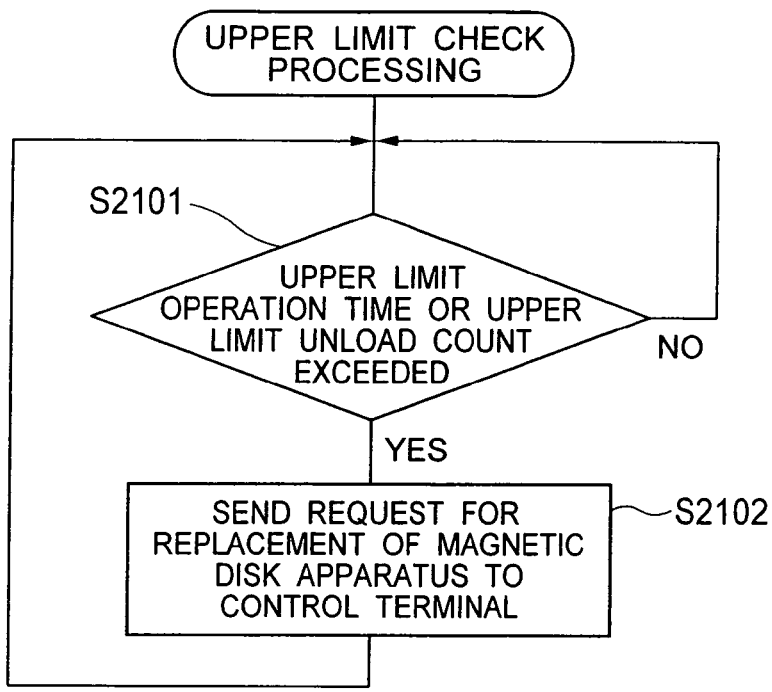
FIG. 21 is a flow chart showing processing of deciding the life of the hard disk drives according to the second embodiment.

FIG. 21 is a flow chart showing a processing flow of deciding the life of the hard disk drives 80 and sending a request for replacement of the hard disk drives 80 to the control terminal 90 as required.

The upper limit check section 1316 refers to the hard disk drive control table 1402 and monitors whether there are any hard disk drives 80 whose accumulated operation time exceeds the upper limit operation time set in the upper limit control table 1406 or whose unload count exceeds the upper limit unload count set in the upper limit control table 1406 (S2001). When there are some hard disk drives 80 which exceed the upper limit operation time or upper limit unload time, the upper limit check section 1316 sends the information that the hard disk drives 80 are at the end of their useful life to the control terminal 90.

Thus, by deciding the life of the hard disk drives 80 based on the accumulated operation time and unload count of the head and sending a request for replacement of the hard disk drives 80 to the control terminal 90, etc., it is possible to prevent trouble of the hard disk drives 80. This can enhance availability of the entire disk array apparatus 10.

==Dynamic Spare Processing Flow==

Figure 22:
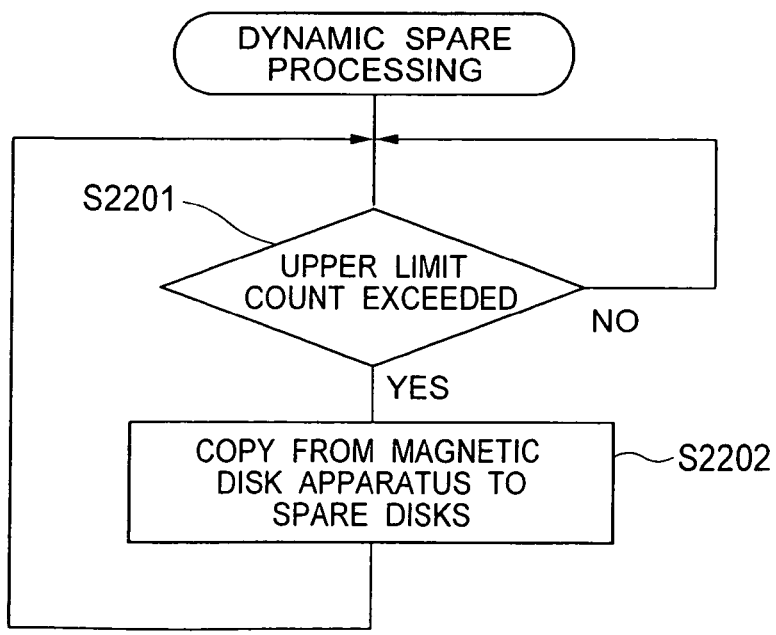
FIG. 22 is a flow chart showing processing of replacing hard disk drives by spare drives based on a count of errors produced at the hard disk drives according to the second embodiment.

FIG. 22 is a flow chart showing a processing flow of replacing the hard disk drives 80 by the spare drives 85 based on the count of errors which have occurred in the hard disk drives 80.

The dynamic spare execution section 1311 refers to the hard disk drive control table 1402, monitors whether there are any hard disk drives 80 whose error count exceeds an upper limit error count according to the accumulated operation time set in the error control table 1407 (S2201). When there are some hard disk drives 80 whose error count exceeds the upper limit error count, the dynamic spare execution section 1311 copies duplicates of data stored in the hard disk drives 80 to the spare drives 85 (S2202).

In this condition, when the information processing apparatus 20 issues a request for a read from the logical volume 83 constructed by including the hard disk drives 80, the read request responding section 1312 executes processing on the read request using the spare drives 85. Likewise, when the information processing apparatus 20 issues a request for a write to the logical volume 83 constructed by including the hard disk drives 80, the write request responding section 1314 executes processing on the write request using the spare drives 85.

In this way, an error upper limit value is set for each accumulated operation time and when the upper limit value is exceeded, it is possible to copy data to the spare drives 85. Therefore, it is possible to perform control so as to start a response to an access request from the information processing apparatus 20 using the spare drives 85 before trouble occurs with the hard disk drives 80 to thereby avoid interruption of access due to the trouble with the hard disk drives 80.

The foregoing embodiments have been explained so far, but these embodiments are intended to facilitate an understanding of the present invention and not to interpret the present invention restrictively. The present invention can be modified or improved in various manners without departing from the spirit of the present invention and the present invention also includes the equivalents thereof.

What is claimed is:

1. A disk array apparatus connected to an information processing apparatus so as to be able to communicate therewith, comprising:

a plurality of hard disk drives;

a controller constructed by including a host interface which receives a request for a data read and request for a data write from/to said hard disk drives from said information processing apparatus, a disk interface connected to said hard disk drives so as to be able to communicate therewith through a communication path which performs data input/output to/from said hard disk drives, a memory, a CPU which controls said host interface and said disk interface and a time counting mechanism; and a first controller coupled to an information processing apparatus and controlling to transfer/receive data to/from said information processing apparatus and controlling to read/write data, wherein a logical volume is formed in a RAID group with redundancy made up of a plurality of said hard disk drives, said disk array apparatus comprising:

an access time storage section which stores, upon reception of a request for a data read or request for a data write from/to said logical volume from said information processing apparatus, the time acquired from said time counting mechanism as the access time in said memory in association with an identifier of said RAID group in which said logical volume is formed; and a power saving mode execution section which refers to said access time stored in said memory and sets a number of said hard disk drives according to the redundancy of said RAID group to a power saving mode when the difference between the time acquired from said time counting mechanism and said access time exceeds a predetermined time, wherein said plurality of hard disk drives include (1) a plurality of first disk drives each coupled to both said first controller, each of first disk drives corresponding to a converter and storing data received via said converter, said converter performing a conversion of an interface between a Fibre Channel (FC) interface and a Serial AT Attachment (Serial ATA) interface, (2) a plurality of second disk drives each coupled to said first controller and storing data sent according to a FC interface, and (3) at least one spare disk drive, a first Redundant Array of Inexpensive Disks (RAID) group is formed by using said first disk drives, a second RAID group is formed by using said second disk drives, said first controller stores data in said spare disk drive and corresponds the stored data in said spare disk to data stored in at least one of said first disk drives, if said first controller performs a first spare process, and said first controller stores data in said spare disk drive and corresponds the stored data in said spare disk to data stored in at least one of said second disk drives, if said first controller performs a second spare process.

2. A disk array apparatus according to claim 1, further comprising:
a basic case comprising said first controller; and
an additional case comprising said first disk drives.

3. A disk array apparatus according to claim 1, wherein:
said first controller includes a computer program, and said computer program include codes controlling to form said first RAID group and controlling to form said second RAID group.

4. A disk array apparatus according to claim 1, wherein:
said first controller comprises a first CPU and a first memory;
said first CPU forms said first RAID group and said second RAID group; and
said first memory stores first information of said first RAID group, second information of said first disk drives, third information of said second RAID group, and fourth information of said second disk drives.

5. A disk array apparatus according to claim 1, wherein:
said first controller comprises a first CPU and a first memory;
said first CPU forms said first RAID group and said second RAID group; and
aid first memory stores first information of said first RAID group, second information of said first disk drives, third information indicating that communication interface of said first disk drives is said Serial ATA interface, fourth information of said second RAID group, fifth information of said second disk drives, and sixth information indicating that communication interface of said second disk drives is said FC interface.

6. A disk array apparatus according to claim 1, wherein:
said first controller automatically performs said first spare process based on error information of said at least one of said first disk drives, and
said first controller automatically performs said second spare process based on error information of said at least one of said second disk drives.

7. A disk array apparatus according to claim 1, wherein:
said first controller comprises a first CPU and a first memory;
said first CPU forms said first RAID group;
said first memory stores first information of said first RAID group, second information of said first disk drives, and error information of said at least one of said first disk drives; and
said first controller performs said first spare process of said at least one of said first disk drives based on said error information of said at least one of said first disk drives.

8. A disk array apparatus according to claim 1, wherein:
said first controller comprises a first CPU and a first memory;
said first CPU forms said first RAID group;
said first memory stores first information of said first RAID group, second information of said first disk drives, third information indicating that communication interface of said first disk drives is said Serial ATA interface, and error information of said at least one of said first disk drives, fourth information of said second RAID group, fifth information of said second disk drives, and sixth information indicating that communication interface of said second disk drives is said FC interface, and error information of said at least one of said second disk drives;
said first controller performs said first spare process of said at least one of said first disk drives based on said error information of said at least one of said first disk drives; and
said first controller performs said second spare process based on said error information of said at least one of said second disk drives.

9. A disk array apparatus according to claim 1, wherein:
said first controller comprises a first CPU and a first memory;
said first CPU forms said first RAID group and said second RAID group;
said first memory stores error information of said at least one of said first disk drives and error information of said at least one of said second disk drives;
said first controller performs said first spare process of said at least one of said first disk drives based on the number of errors of said at least one of said first disk drives is over a level; and
said first controller performs said second spare process based on the number of errors of said at least one of said second disk drives is over a level.

* * * * *